United States Patent
Nakagata et al.

(10) Patent No.: US 9,607,348 B2
(45) Date of Patent: Mar. 28, 2017

(54) POSITION INFORMATION ADDING APPARATUS, POSITION INFORMATION ADDING METHOD, AND COMPUTER PROGRAM FOR ADDING POSITION INFORMATION AND POSITION DETECTION APPARATUS

(71) Applicant: FUJITSU LIMITED, Kawasaki-shi, Kanagawa (JP)

(72) Inventors: Shohei Nakagata, Kawasaki (JP); Kensuke Kuraki, Ichikawa (JP); Jun Takahashi, Kawasaki (JP); Taizo Anan, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/990,480

(22) Filed: Jan. 7, 2016

(65) Prior Publication Data
US 2016/0117791 A1    Apr. 28, 2016

Related U.S. Application Data

(60) Division of application No. 14/032,735, filed on Sep. 20, 2013, and a continuation of application No. PCT/JP2011/056792, filed on Mar. 22, 2011.

(51) Int. Cl.
*G06T 1/00*    (2006.01)
*H04N 21/2343*    (2011.01)
(Continued)

(52) U.S. Cl.
CPC ........ *G06T 1/0021* (2013.01); *G06K 9/00711* (2013.01); *G06T 1/005* (2013.01);
(Continued)

(58) Field of Classification Search
CPC ............... G06T 1/0021–1/0092; G06T 2201/005–2201/0601; H04N 21/8358; H04N 19/467
See application file for complete search history.

(56) References Cited

U.S. PATENT DOCUMENTS 6,181,802 B1    1/2001    Todd
6,771,795 B1    8/2004    Isnardi
(Continued)

FOREIGN PATENT DOCUMENTS

JP    10-513324    12/1998
JP    2005-510921    4/2005
(Continued)

OTHER PUBLICATIONS

Notice of Allowance in co-pending U.S. Appl. No. 14/032,735 dated Nov. 30, 2016.
(Continued)

*Primary Examiner* — Chan Park
*Assistant Examiner* — Raphael Schwartz
(74) *Attorney, Agent, or Firm* — Staas & Halsey LLP

(57) ABSTRACT

A position information adding apparatus includes: a reference position setting unit which sets a plurality of reference positions for each of a plurality of pictures contained in digitalized video data; a region setting unit which sets a first position information adding region at a first position defined based on at least any of the plurality of reference positions and a second position information adding region at a second position different from the first position, for each of the plurality of pictures; and a position information embedding unit which embeds a first moving pattern which moves on the pictures in a first temporal period into the first position information adding region and a second moving pattern
(Continued)

which moves on the pictures in a second temporal period into the second position information adding region.

5 Claims, 19 Drawing Sheets

(51) Int. Cl.
    *H04N 21/8358*     (2011.01)
    *H04N 19/467*     (2014.01)
    *G06K 9/00*     (2006.01)

(52) U.S. Cl.
    CPC ......... *G06T 1/0085* (2013.01); *H04N 19/467* (2014.11); *H04N 21/234345* (2013.01); *H04N 21/8358* (2013.01); *G06T 2201/0051* (2013.01); *G06T 2201/0065* (2013.01); *G06T 2201/0601* (2013.01)

(56) References Cited

U.S. PATENT DOCUMENTS

| | | | |
|---|---|---|---|
| 7,564,973 B2 * | 7/2009 | Matsumura | H04N 19/467 348/699 |
| 8,320,606 B1 | 11/2012 | Moorer | |
| 2003/0099372 A1 | 5/2003 | Wendt | |
| 2005/0117775 A1 * | 6/2005 | Wendt | G06T 1/005 382/100 |
| 2006/0126889 A1 | 6/2006 | Nakamura et al. | |
| 2008/0089552 A1 | 4/2008 | Nakamura et al. | |
| 2009/0074242 A1 | 3/2009 | Yamamoto et al. | |

FOREIGN PATENT DOCUMENTS

| | | |
|---|---|---|
| JP | 2005-277732 | 10/2005 |
| JP | 2009-100296 | 5/2009 |
| WO | 2005/074249 A1 | 8/2005 |
| WO | 2007/015452 A1 | 2/2007 |
| WO | 2007/102403 A1 | 9/2007 |

OTHER PUBLICATIONS

Office Action for co-pending U.S. Appl. No. 14/032,735 dated Aug. 4, 2016.

Suzuki et al., "Method to Specify Time and Space Axis of Digital Watermark against Re-shot Image", Forum on Information Technology, 2009, pp. 307-308.

International Search Report of PCT/JP2011/056792 mailed Jun. 28, 2011.

U.S. Appl. No. 14/032,735, filed Sep. 20, 2013, Nakagata et al., Fujitsu Limited.

Office Action for co-pending U.S. Appl. No. 14/032,735 dated Apr. 20, 2016.

* cited by examiner

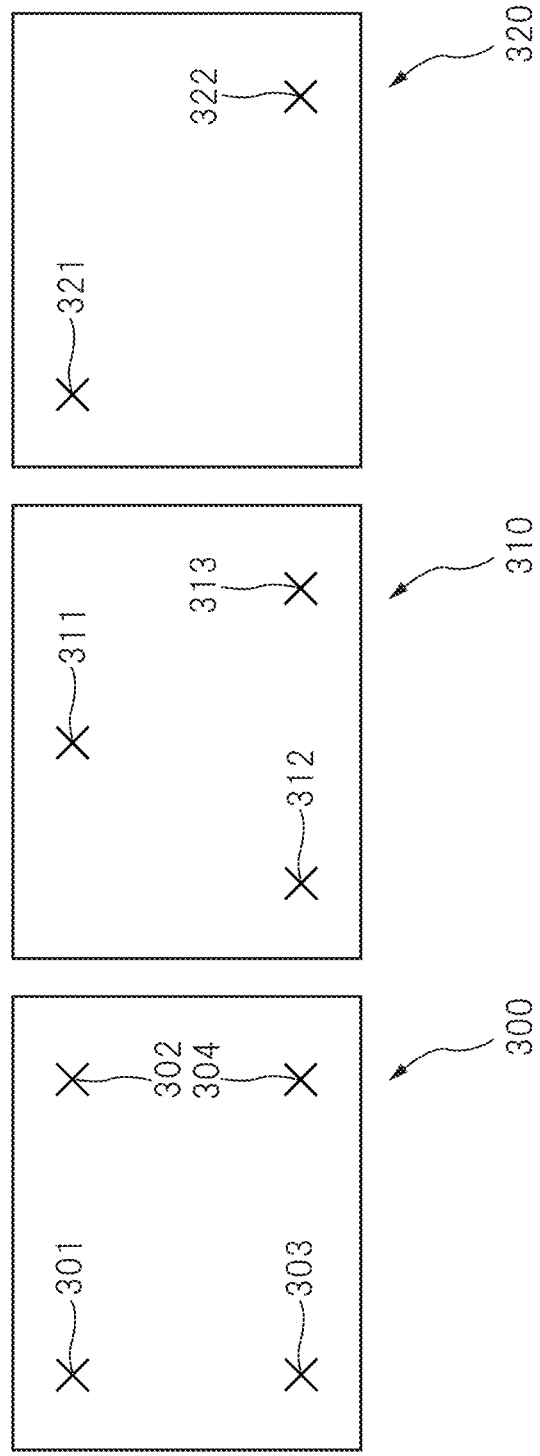

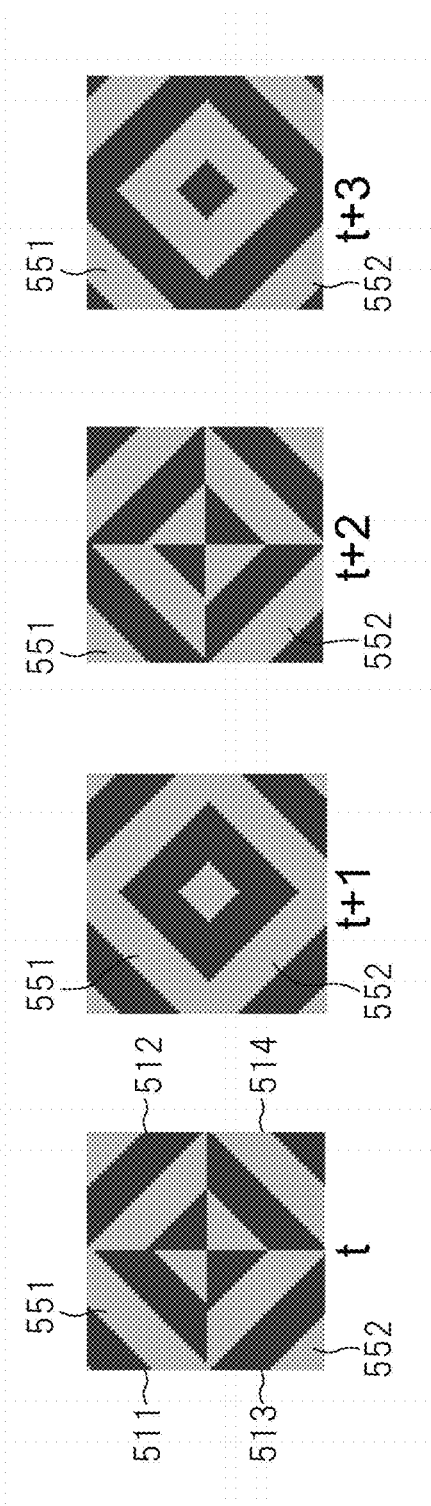

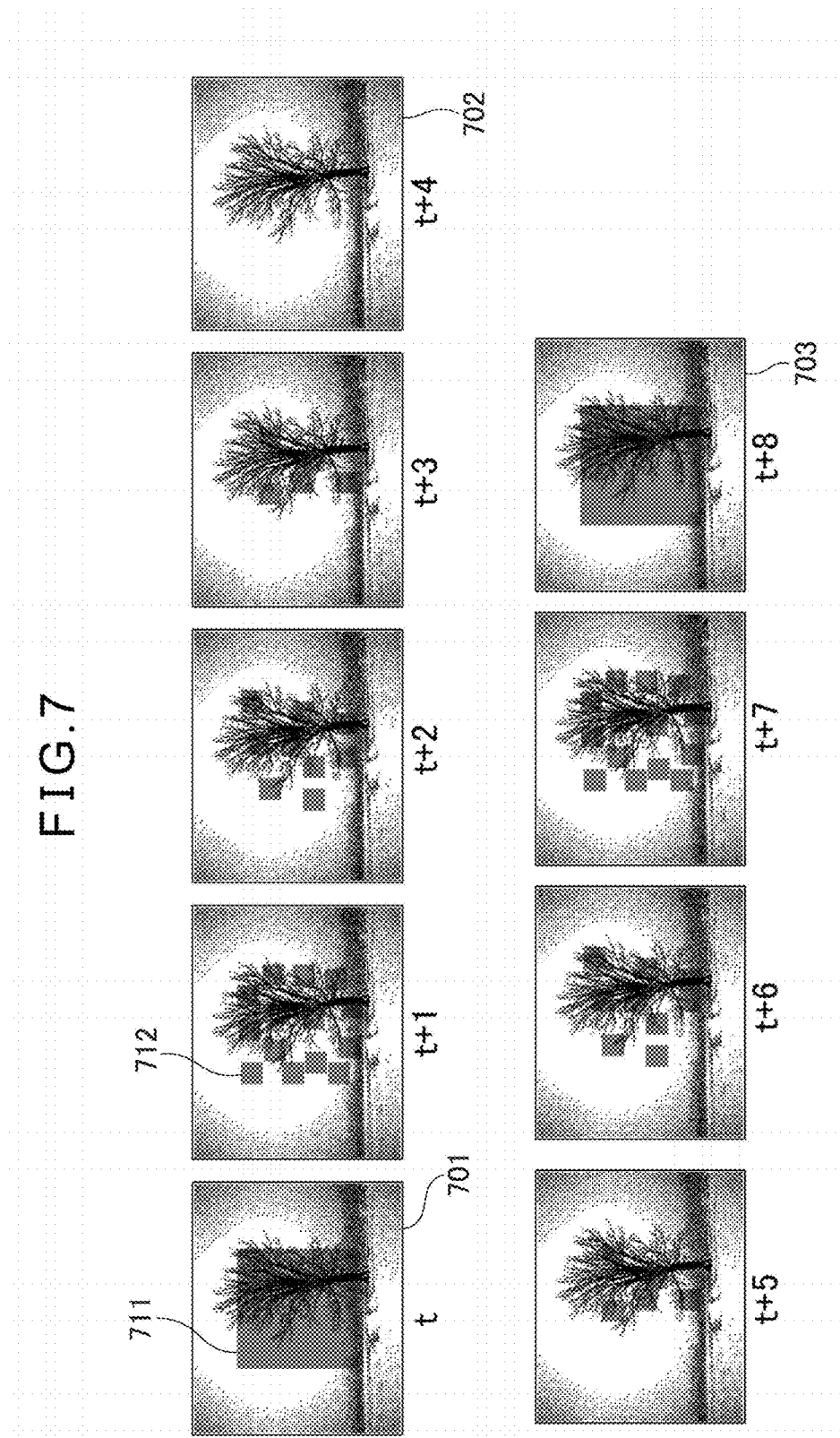

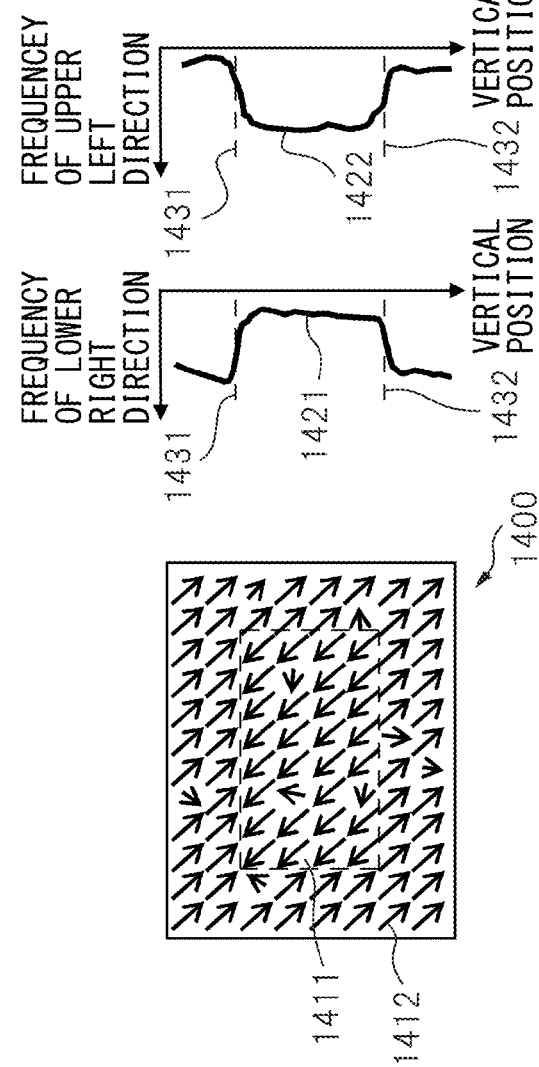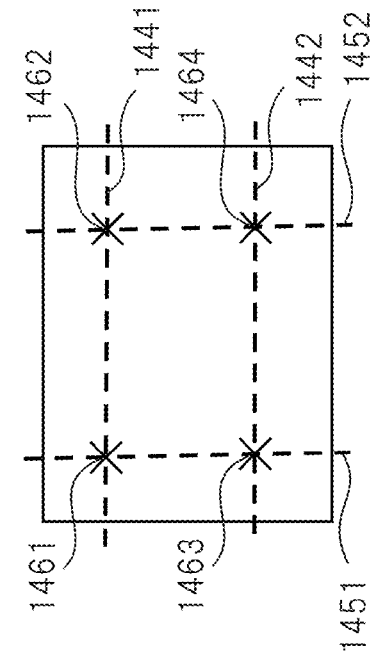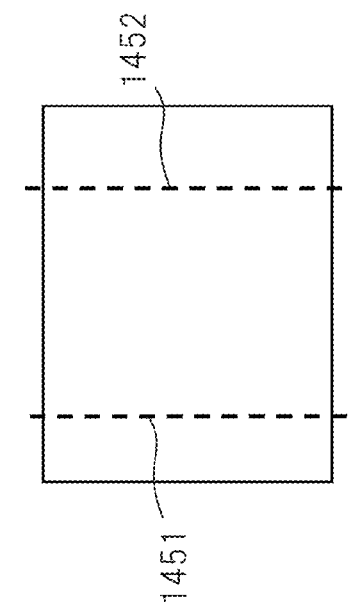

POSITION INFORMATION ADDING APPARATUS, POSITION INFORMATION ADDING METHOD, AND COMPUTER PROGRAM FOR ADDING POSITION INFORMATION AND POSITION DETECTION APPARATUS

CROSS-REFERENCE TO RELATED APPLICATION

This application is a divisional application of U.S. application Ser. No. 14/032,735 filed Sep. 20, 2013, which is a continuation application and is based upon PCT/JP2011/056792, filed on Mar. 22, 2011, the entire contents of both are incorporated herein by reference.

FIELD

The embodiments discussed herein are related to a position information adding apparatus, a position information adding method, and a computer program for adding position information, which add position information to identify a predefined reference position to a digitized image. The embodiments discussed herein also are related to a position detection apparatus for detecting a predefined reference information from an image to which such position information is added.

BACKGROUND

Services for delivering digitized content such as movies and music over the Internet or the like have been in use in recent years. Such content is encrypted by Digital Rights Management (DRM) technology before delivery. DRM technology protects the content against illegally copying and distributed. However, there are many instances in which content viewers illegally copy video content by capturing the video content displayed on a computer display or a television monitor by using an image capturing apparatus such as a video camera and illegally distribute the copied video content. Since the video content displayed on the display is not encrypted, it is difficult to prevent the distribution of the video content copied by capturing the displayed video.

In view of the above, a technology has been developed that embeds information such as a viewer identification number as a digital watermark before delivering the content. The digital watermark remains intact in the copied video content even when the video content with the embedded digital watermark is illegally copied, for example, by capturing the displayed video content using a video camera. Therefore, even after the video content illegally copied by such analog capture is distributed, the identification number of the viewer that has made illegal use of the video content can be identified by detecting the digital watermark from the copied video content. Accordingly, even when the video content illegally copied by analog capture is uploaded to a website or the like, an administrator of the video content can identify the illegal copy source from the information embedded in the uploaded video content.

Furthermore, the digital watermarking technique may be applied to digital signage. For example, by detecting digital watermark information from video obtained by capturing digital video for advertisement displayed on a street screen or a television into which the digital watermark information is embedded, a user may obtain additional information such as detailed information of a product introduced by the digital video for advertisement.

In video data re-digitized by capturing video content displayed on a display using a capturing apparatus, a region of an image included in the original video content may be expanded or shrunk, or a position of the image region may be shifted at the time of capturing. Therefore, in such re-digitalized video data, a size and a position of a region in which digital watermark information is embedded may be different from the original size and position. A technique to detect edges of a rectangular image within an image is proposed to accurately detect digital watermark information (for example, refer to Japanese Laid-Open Patent Publication No. 2005-277732). In addition, a technique for changing a luminance value of a pixel at a predefined position of each picture of video data in a predetermined pattern along the time axis is proposed (for example, refer to Japanese Laid-Open Patent Publication No. 2005-277732 or Suzuki et al. (2009) Method for specifying spatio-temporal coordinate of digital watermark against re-captured image. Eighth Forum on Information Technology 2009 I-033, 307-308).

However, edges of the original rectangular image may not be captured within an image included in re-digitized video data or luminance variations among adjacent pixels at the edges may not be apparent. In such a case, an apparatus for detecting digital watermark information is unable to detect the edges of the rectangular image and, as a result, may not accurately identify the region into which digital watermark information was embedded. Furthermore, in order to detect a position of a pixel with such a luminance value variation by checking a luminance value variation of each pixel, images including at least one cycle of a pattern of a luminance value variation may be required. However, when an illegal user captures video content using a video camera, a position of the video camera may change due to a camera shake or the like, which also leads to a change in the position of the pixel to which a luminance value variation among images is added. As a result, an apparatus for detecting digital watermark information may not accurately detect the position of the pixel to which a luminance value variation is added.

SUMMARY

According to one embodiment, a position information adding apparatus is provided. The position information adding apparatus includes: a reference position setting unit which sets a plurality of reference positions for each of a plurality of pictures contained in digitalized video data; a region setting unit which sets a first position information adding region at a first position defined based on at least any of the plurality of reference positions and a second position information adding region at a second position different from the first position, for each of the plurality of pictures; and a position information embedding unit which embeds a first moving pattern which moves on the pictures in a first temporal period into the first position information adding region and a second moving pattern which moves on the pictures in a second temporal period into the second position information adding region.

According to another embodiment, a position detection apparatus for detecting a reference position on a picture which is contained in digitized video data, and in which a first moving pattern which moves in a first temporal period is embedded on a first position information adding region having a first positional relationship with the reference position and a second moving pattern which moves in a second temporal period is embedded on a second position information adding region having a second positional relationship with the reference position, is provided. The position detection apparatus includes: a feature quantity extracting unit which obtains a feature quantity for each pixel of the picture which represents at least either a movement of a pattern captured on a region containing the pixel or a spatial feature of the pattern; an evaluation value calculating unit which obtains an evaluation value, for a predetermined region on the picture, representing a degree of likelihood that the predetermined region is at the reference position, based on the feature quantity of a pixel within a region having the first positional relationship with the predetermined region and the feature quantity of a pixel within a region having the second positional relationship with the predetermined region; and a reference position detection unit which detects the reference position based on the predetermined region with a maximum evaluation value.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A to FIG. 3C are diagrams each illustrating an example of reference positions set on a picture.

FIG. 6A to FIG. 6D are diagrams depicting temporal variations of the moving patterns of the position information adding regions illustrated in FIG. 5C at times t to (t+3).

FIG. 7 is a diagram illustrating an example of a temporal variation of one cycle of a watermark pattern.

FIG. 14A is a diagram illustrating an example of a distribution of motion vectors on a picture.

FIG. 14B is a graph depicting a distribution, for each row, of the number of motion vectors of a direction from upper left to lower right and the number of motion vectors of a direction from lower right to upper left.

FIG. 14C is a diagram depicting boundaries of a vertical direction of a position information adding region.

FIG. 14D is a diagram depicting boundaries of a horizontal direction of a position information adding region.

FIG. 14E is a diagram depicting the relationship between the reference positions and the boundaries of the vertical and horizontal directions of the position information adding region.

DESCRIPTION OF EMBODIMENTS

A position information adding apparatus according to various embodiments will be described below with reference to the drawings. The position information adding apparatus adds, as position information, a moving pattern whose position changes with elapsing time within a region defied on each picture within a predetermined section included in video data in which digital watermark information is embedded. Then the position information adding apparatus embeds the digital watermark information into a predetermined region with the relative position to the predetermined region being set in advance.

For convenience, a pixel and a region in which digital watermark information is embedded are respectively referred to as a watermark pixel and a watermark region in the following. A picture included in video data may be a frame or a field generated according to an interlace method.

Figure 1:
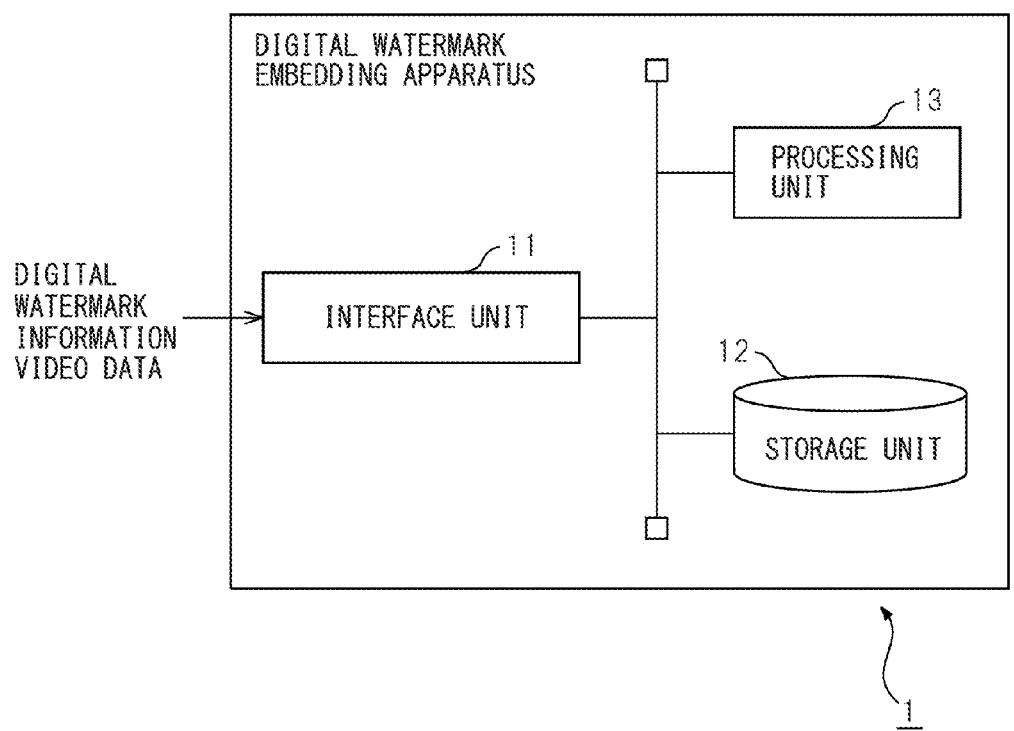
FIG. 1 is a diagram illustrating in simplified form the configuration of a position information adding apparatus according to a first embodiment.

FIG. 1 is a diagram illustrating in simplified form the configuration of a digital watermark embedding apparatus according to a first embodiment. The digital watermark embedding apparatus 1 is an example of the position information adding apparatus. The digital watermark embedding apparatus 1 includes an interface unit 11, a storage unit 12, and a processing unit 13. The digital watermark embedding apparatus 1 embeds position information and digital watermark information into video data acquired through the interface unit 11.

The interface unit 11 includes, for example, a signal interface for connecting the digital watermark embedding apparatus 1 to an input device (not depicted) such as a video camera or a display device (not depicted) such as a liquid crystal display and a control circuit for the signal interface. Alternatively, the interface unit 11 may include a communication interface for connecting the digital watermark embedding apparatus 1 to a communication network conforming to a communication standard such as the Ethernet (registered trade mark), and a control circuit for the communication interface. Further alternatively, the interface unit 11 may include a circuit for connecting the digital watermark embedding apparatus 1 to an antenna to receive video data delivered through a wireless link and for decoding the video data received via the antenna. The interface unit 11 acquires video data from the input device or via the communication network or the antenna and passes the video data to the processing unit 13.

The interface unit 11 may further include an interface circuit conforming to a bus standard such as Universal Serial Bus in order to connect a user interface device such as a keyboard or a mouse to the digital watermark embedding apparatus 1. Then, the interface unit 11 acquires, from the user interface device or the communication network, data to be embedded as digital watermark information into the video data, and passes the data to the processing unit 13.

The digital watermark information contains at least one among, for example, an identification number of a viewer, an identification number of a video data provider, and an identification number of a video displaying apparatus in which the digital watermark embedding apparatus 1 is incorporated. In the present specification, a plurality of digits or symbols representing a viewer's identification number or the like contained in digital watermark information is represented by a bit string.

Furthermore, the interface unit 11 receives video data with embedded digital watermark information from the processing unit 13 and outputs the video data with embedded digital watermark information to a display device such as a liquid crystal display. Alternatively, the interface unit 11 may transmit the video data with embedded digital watermark to other apparatus connected to the digital watermark embedding apparatus 1 via the communication network.

The storage unit 12 includes at least one device among, for example, a semiconductor memory device, a magnetic disk device, and an optical disk device. The storage unit 12 stores a computer program to be executed on the digital watermark embedding apparatus 1 and various kinds of parameters, for example, a reference position and a range of a watermark region, to be used in order to embed position information and digital watermark information. Further, the storage unit 12 may temporarily store the digital watermark information and parts of video data into which the digital watermark information is yet to be embedded, until the digital watermark-embedded video data is created by the processing unit 13. In addition, the storage unit 12 may store video data into which digital watermark information has been embedded.

The processing unit 13 includes one or a plurality of processors, a memory circuit such as a random access memory, and their peripheral circuitry. The processing unit 13 controls the entire operation of the digital watermark embedding apparatus 1. In addition, the processing unit 13 embeds position information and digital watermark information into video data.

Figure 2:
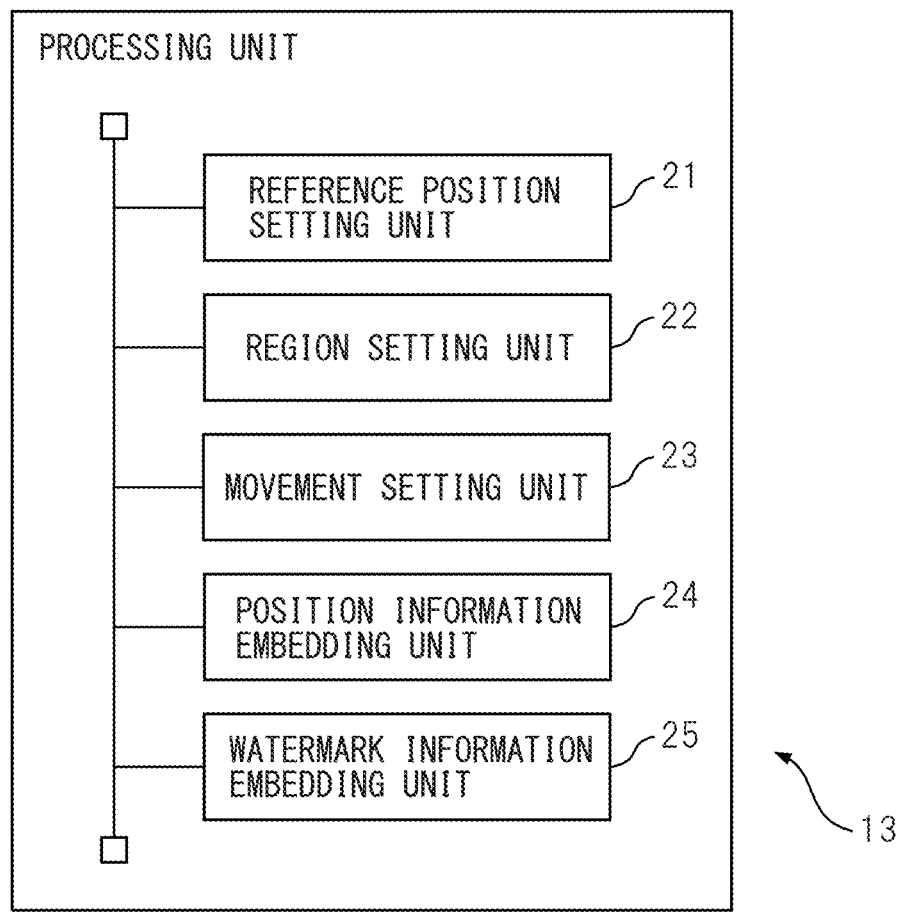
FIG. 2 is a block diagram illustrating functions which a processing unit according to the first embodiment implements in order to add position information to video data.

FIG. 2 is a block diagram illustrating functions which the processing unit 13 implements in order to embed position information and digital watermark information into video data. The processing unit 13 includes a reference position setting unit 21, a region setting unit 22, a movement setting unit 23, a position information embedding unit 24, and a watermark information embedding unit 25. These units constituting the processing unit 13 are functional modules implemented by executing a computer program on a processor incorporated in the processing unit 13. Furthermore, these units included in the processing unit 13 may be incorporated as respective operation circuits in the digital watermark embedding apparatus 1 or as a single integrated circuit, in which the operation circuits are integrated, in the digital watermark embedding apparatus 1.

The reference position setting unit 21 sets a plurality of reference positions for each picture included in a predetermined section of video data in which digital watermark information is to be embedded. The positional relationship between a reference position and a watermark pixel or a watermark region is predetermined and the positional relationship is known to the digital watermark detection apparatus. Accordingly, when the digital watermark detection apparatus can detect a reference position on a picture included in video data into which digital watermark information is embedded, the watermark pixel or the watermark region can be identified based on the reference position. Note that a predetermined section may consist of pictures from the beginning to the end of video data or a portion of the video data.

In the present embodiment, the reference position setting unit 21 sets the reference positions for each picture according to coordinates of reference positions stored in the storage unit 12 in advance. Alternatively, the reference position setting unit 21 may obtain information representing coordinates of reference positions from other device through the interface unit 21 and set the reference positions for each picture according to the obtained information. Alternatively, the reference position setting unit 21 may obtain information representing coordinates of reference positions through a user interface (not illustrated) and set the reference positions for each picture according to the obtained information. Then the reference position setting unit 21 informs the region setting unit 22 of the coordinates of the reference positions.

FIG. 3A to FIG. 3C are diagrams each illustrating an example of reference positions set on a picture. In FIG. 3A, reference positions 301 to 304 are set at four points in upper left, upper right, lower left, and lower right regions for a picture 300. The four reference positions are set, for example, to be the vertices of a rectangle. In FIG. 3B, three reference positions 311 to 313 are set for a picture 310. The three reference positions 311 to 313 are set, for example, to be the vertices of a triangle. In FIG. 3C, two reference positions 321 and 322 are set for a picture 320. The two reference positions 321 and 322 are set, for example, at two corner positions located diagonally of a rectangle. Note that, when three or more reference positions are set on a picture, the reference positions are not restricted to the vertex positions of a polygon but can be arranged, for example, along a line on a picture.

The reference positions may be set at any position on a picture. However, it is preferable that reference positions be set at positions close to the center of a picture rather than the edges of the picture so that at least two reference positions are captured on a captured picture, when video data with embedded digital watermark information is captured using a video camera or the like.

The region setting unit 22 sets, as respective position information adding regions, a plurality of regions on a picture into which position information is to be embedded based on reference positions.

Figure 4A:
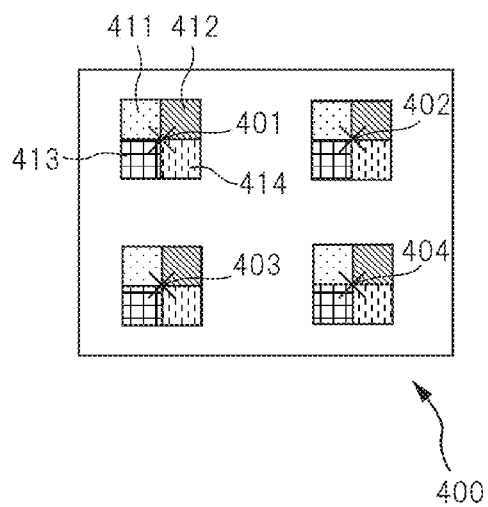
FIG. 4A and FIG. 4B are diagrams each depicting an example of position information adding regions set based on the reference positions illustrated in FIG. 3A.
Figure 4B:
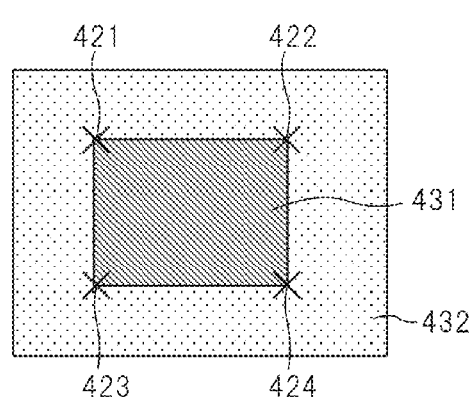

FIG. 4A and FIG. 4B are diagrams each depicting an example of position information adding regions set based on the reference positions illustrated in FIG. 3A. In FIG. 4A, four reference positions 401 to 404 are set on a picture 400. Four rectangular regions are set around each of the reference positions as position information adding regions. For example, a position information adding region 411 which is rectangular with the reference position 401 being at the lower right vertex is set at the upper left of the reference position 401 arranged at the upper left of the picture 400. A position information adding region 412 which is rectangular with the reference position 401 being at the lower left vertex is set at the upper right of the reference position 401. Similarly, a position information adding region 413 which is rectangular with the reference position 401 being at the upper right vertex is set at the lower left of the reference position 401 and a position information adding region 414 which is a rectangular with the reference position 401 being at the upper left vertex is set lower right of the reference position 401. In addition, in FIG. 4B, a rectangular region 431 with four reference positions 421 to 424 being at respective vertices and an region 432 surrounding the rectangular region 431 are set as position information adding regions.

Note that any of the position information adding regions may be a triangle or a circle. For example, the region setting unit 22 may set a triangular region with the three reference positions illustrated in FIG. 3B being at respective vertices and a region surrounding the triangular region as position information adding regions. In addition, dividing a picture into two regions with a line connecting the two reference positions illustrated in FIG. 3C, the region setting unit 22 may set the two regions as respective position information adding regions. Furthermore, the region setting unit 22 may set, as respective position information adding regions, a circular region with the two reference positions illustrated in FIG. 3C being at the both ends of diameter of the circle and a ring shaped region surrounding the circular region. Furthermore, position information adding regions may not be adjacent to each other. Furthermore, each position information adding region may be set such that a reference position is included in one of the position information adding regions or located apart from any of the position information adding regions.

A size of a position information adding region may be larger than a moving pattern to be embedded into the position information adding region as position information and may be a size such that a plurality of position information adding regions do not overlap each other. Thereby, any point on a picture may be included in any position information adding regions as illustrated in FIG. 4B or a region which does not overlap with any position information adding regions may be included in a picture as illustrated in FIG. 4A.

The region setting unit 22 notifies the movement setting unit 23 of information representing a position and a range of a position information adding region for each of the position information adding regions. For example, information representing a position and a range of a position information adding region includes, when a position information adding region is a polygon, a coordinate of each vertex of each position information adding region or at least one vertex and a plurality of lengths of the sides or the like and includes, when a position information adding region is a circle, the coordinate of the center and the radius.

The movement setting unit 23 sets a moving direction and a move quantity according to elapsed time of a moving pattern to be embedded into each of a plurality of position information adding regions. At that time, the movement setting unit 23 creates groups each including at least two among a plurality of position information adding regions. Then the movement setting unit 23 sets, for example, moving directions which are different from each other, for a plurality of position information adding regions included in a same group. Note that, when different moving patterns for a plurality of position information adding regions included in a same group are embedded, the movement setting unit 23 may set the same moving direction to each of the position information adding regions included in the group. Note that the movement setting unit 23 sets the same move quantity for each of the position information adding regions. Alternatively, the movement setting unit 23 may vary a move quantity per unit time of a moving pattern for each of position information adding regions.

The movement setting unit 23 notifies the position information embedding unit 24 of information representing a moving direction and a move quantity of a moving pattern of each of position information adding regions, for example, a vector representing a moving direction and a move quantity of a moving pattern between two continuous pictures and a coordinate of the center of the corresponding position information adding region.

The position information embedding unit 24 embeds a moving pattern moving along a moving direction set by the movement setting unit 23 into each of the position information adding regions.

Figure 5A:
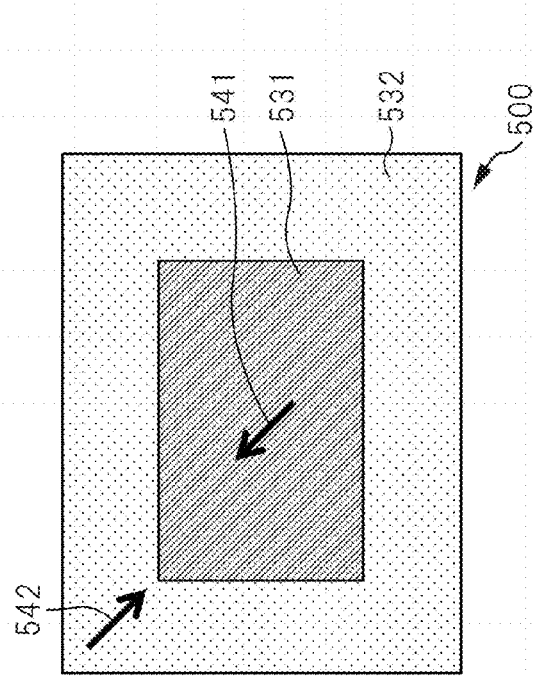
FIG. 5A is a diagram illustrating an example of the relationship between the position information adding regions illustrated in FIG. 4A and moving directions of moving patterns.
Figure 5B:
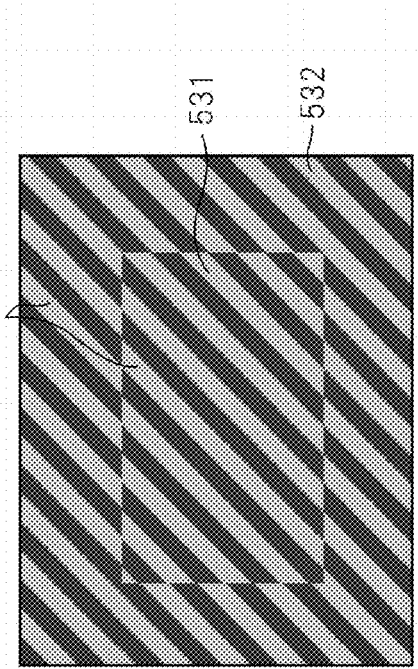
FIG. 5B is a diagram illustrating an example of the relationship between the position information adding regions illustrated in FIG. 4B and moving directions of moving patterns.

FIG. 5A is a diagram illustrating an example of the relationship between the position information adding regions illustrated in FIG. 4A and moving directions of moving patterns and FIG. 5B is a diagram illustrating an example of the relationship between the position information adding regions illustrated in FIG. 4B and moving directions of moving patterns.

In FIG. 5A, four groups of position information adding regions are set on a picture 500, the four groups surrounding respective reference positions 501 to 504. For example, four position information adding regions 511 to 514 are set to surround the reference position 501 located at the upper left of the picture 500. An arrow illustrated in each position information adding region indicates a moving direction of a moving pattern to be embedded into the position information adding region. For example, a moving pattern which moves, as an arrow 521 indicates, from upper left to lower right as time elapses is embedded into the position information adding region 511 set at the upper left of the reference position 501. In addition, a moving pattern which moves, as an arrow 522 indicates, from lower left to upper right as time elapses is embedded into the position information adding region 512 set at the upper right of the reference position 501. Furthermore, a moving pattern which moves, as an arrow 523 indicates, from upper right to lower left as time elapses is embedded into the position information adding region 513 set lower left of the reference position 501. Furthermore, a moving pattern which moves, as an arrow 524 indicates, from lower right to upper left as time elapses is embedded into the position information adding region 514 set lower right of the reference position 501.

In FIG. 5B, two position information adding regions 531 and 532 are set in the picture 500. A moving pattern which moves, as an arrow 541 indicates, from lower right to upper left as time elapses is embedded into the position information adding region 531 set near the center of the picture 500. In addition, a moving pattern which moves, as an arrow 542 indicates, from upper left to lower right as time elapses is embedded into the position information adding region 532 surrounding the position information adding region 531.

Figure 5C:
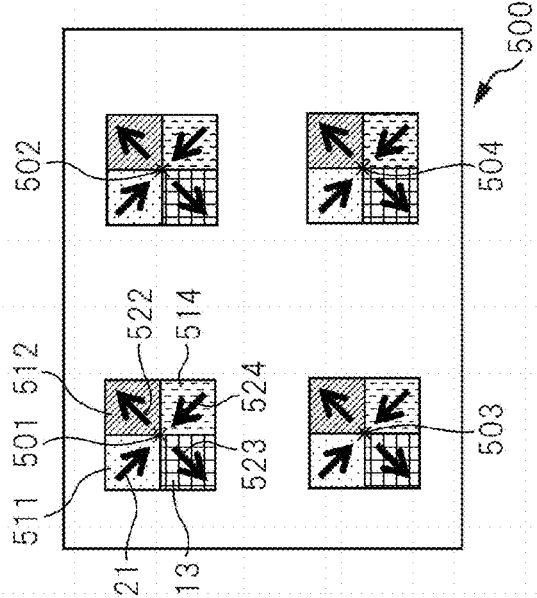
FIG. 5C is a diagram depicting an example of moving patterns to be embedded into respective position information adding regions illustrated in FIG. 5A.
Figure 5D:
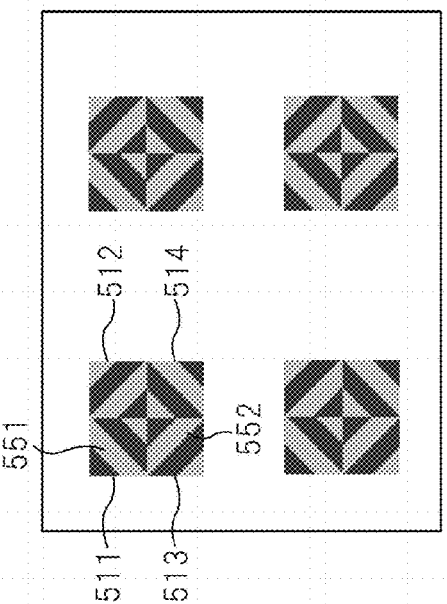
FIG. 5D is a diagram depicting an example of moving patterns to be embedded into respective position information adding regions illustrated in FIG. 5B.

FIG. 5C is a diagram depicting an example of a moving pattern to be embedded into each of the position information adding regions illustrated in FIG. 5A and FIG. 5D is a diagram depicting an example of a moving pattern to be embedded into each of the position information adding regions illustrated in FIG. 5B.

As depicted in FIG. 5C, a striped moving pattern in which pixel values change cyclically along a direction approximately parallel with a moving direction of a moving pattern is embedded into each of the position information adding regions. For example, a striped moving pattern 551 in which pixel values change cyclically along a direction from upper left to lower right is embedded into the position information adding regions 511 and 514. In addition, a striped moving pattern 552 in which pixel values change cyclically along a direction from lower left to upper right is embedded into the position information adding regions 512 and 513.

As depicted in FIG. 5D, a striped moving pattern 561 in which pixel values change cyclically along a direction from upper left to lower right, i.e. along the direction in which the moving pattern moves, is embedded into each of the position information adding regions 531 and 532.

In FIG. 5C and FIG. 5D, dark regions included in the moving patterns indicate that a pixel value to be added to values of corresponding pixels of the picture is smaller than a pixel value to be added to values of corresponding pixels of the picture in bright regions included in the moving pattern. For example, '0' is added to pixel values of pixels included in the dark regions and '1' is added to values of pixels included in the bright regions.

Note that, in this example, the moving pattern to be embedded into the position information adding region 531 is the same as the moving pattern to be embedded into the position information adding region 532. However, the moving pattern to be embedded into the position information adding regions 531 may be different from the moving pattern to be embedded into the position information adding regions 532. For example, a pitch of a striped moving pattern to be embedded into the position information adding regions 531 may be larger than a pitch of a striped moving pattern to be embedded into the position information adding regions 532. In addition, a moving pattern to be embedded into each of position information adding regions may not be a cyclic pattern such as a striped pattern but it is preferable that a moving pattern be a pattern in which pixel values change along the moving direction of the moving pattern.

FIG. 6A to FIG. 6D are diagrams each depicting moving patterns 551 and 552 of the position information adding regions 511 to 514 illustrated in FIG. 5C at times t to (t+3). As illustrated in FIG. 6A to FIG. 6D, it is understood that the moving pattern 551 moves along an axis from upper left to lower right and the moving pattern 552 moves along an axis from lower left to upper right.

The position information embedding unit 24 calculates a value of each pixel within a position information adding region with an embedded moving pattern according to, for example, the following equation.

$$F'(x,y,t) = F(x,y,t) + \alpha(x,y,t) \times W(x,y,t) \quad (1)$$

Where $F(x,y,t)$ is a pixel value of a picture at horizontal coordinate x and vertical coordinate y at time t. Note that the pixel value is, for example, a luminance value when the picture is a gray image or the pixel value is, for example, a value of one color component among a red component, a blue component, and a green component when the picture is a color image. $W(x,y,t)$ is a pixel value of a moving pattern at horizontal coordinate x and vertical coordinate y at time t. $\alpha(x,y,t)$ is a signal intensity adjusting parameter and is used for adjusting a value to be added to a pixel at horizontal coordinate x and vertical coordinate y at time t.

$\alpha(x,y,t)$ is set, for example, according to a value of a target pixel for embedding and pixels surrounding the target pixel or according to temporal variations of values of those pixels so that degradation of quality of video data with embedded moving patterns is suppressed. For example, when an image with a uniform pixel value such as sky is captured on a position information adding region of a picture of interest, it is possible that a moving pattern be perceived even when the difference between the maximum value and minimum value of pixel values of the embedded pattern is small. On the other hand, when a complicated pattern in which pixel values greatly vary among adjacent pixels is captured on a position information adding region, accuracy to detect a moving pattern through a digital watermark detection apparatus may be greatly improved by making the difference between the maximum value and minimum value of the pixel values of a pattern to be embedded relatively large. Accordingly, the position information embedding unit 24 obtains a variance of pixel values in a position information adding region and sets $\alpha(x,y,t)$ small as the variance value is small. Alternatively, the position information embedding unit 24 may set $\alpha(x,y,t)$ small as the difference between the maximum value and the minimum value of pixel values in a position information adding region is small.

As in a case that a figure in a position information adding region is still, a moving pattern which moves as time elapses is easily perceived when there is little change in a figure as time elapses. On the other hand, when a figure in a position information adding region moves intensely, accuracy to detect a moving pattern through a digital watermark detection apparatus may be greatly improved by making the difference between the maximum value and the minimum value of pixel values of the pattern to be embedded relatively large. Accordingly, the position information embedding unit 24 may obtain a motion vector in a position information adding region, for example, by performing a block matching among a plurality of successive pictures in time and may set α(x,y,t) small as the motion vector is small. At that time, when a plurality of blocks are set in a position information adding region, the position information embedding unit 24 may determine α(x,y,t) based on the average value of the motion vectors obtained from each of the blocks. Note that the processing unit 13 may receive video data, into which digital watermark information is to be embedded, in a compressed format according to a video coding method with motion compensation such as MPEG-2 and MPEG-4. In such a case, the position information embedding unit 24 embeds a moving pattern after the processing unit 13 decodes the video data. The position information embedding unit 24 may determine α(x,y,t) as described above based on a motion vector included in the compressed video data.

α(x,y,t) may be a predetermined fixed value, for example, 1. Note that, in a case that the pixel value is represented by 0 to 255, α(x,y,t) is determined so that the absolute value of the second term in the right hand side of equation (1) becomes equal to or more than 1 even when α(x,y,t) is set to the minimum value when W(x,y,t) has a value other than 0. In addition, α(x,y,t) is determined so that the absolute value of the second term in the right hand side of equation (1) becomes a value with which a moving pattern is unlikely perceived, for example, 3 or less even when α(x,y,t) is set to the maximum value.

W(x,y,t) is determined, for example, according to the following equation.

$$W(x, y, t) = \begin{cases} P_i(x - v_x[i] \times t, y - v_y[i] \times t) & \text{if } (x, y) \in R \\ 0 & \text{if } (x, y) \notin R \end{cases} \quad (2)$$

Where $R_i$ is a range of an i-th position information adding region and $P_i(x,y)$ is a pixel value at horizontal coordinate x and vertical coordinate y included in a moving pattern to be embedded in the position information adding region $R_i$. In a case that the pixel value is represented by 0 to 255, $P_i(x,y)$ is set to a value, for example, in a range of 0 to 3. $(v_x[i],v_y[i])$ are respectively a horizontal component and a vertical component of a moving direction of the moving pattern. As an example, $P_i(x,y)$ is set to satisfy the following equation for any (x,y), when cycles of the horizontal component and the vertical component of the moving pattern are $(T_x[i],T_y[i])$.

$$P_i(x+T_x[i],y+T_y[i])=P_i(x,y) \quad (3)$$

The position information embedding unit 24 passes the picture with the embedded position information to the watermark information embedding unit 25.

The watermark information embedding unit 25 embeds digital watermark information into the picture received from the position information embedding unit 24. The watermark information embedding unit 25 may utilize any of various digital watermark information embedding methods suitable for video data for embedding digital watermark information. For example, the watermark information embedding unit 25 sequentially embeds one bit at a time from the first bit of the digital watermark information into a plurality of pictures lined up in chronological order included in the video data. For example, the watermark information embedding unit 25 sets a pixel value of a watermark pixel at a predetermined position of each picture to a pixel value corresponding to a value of the bit sequentially from the first bit of the digital watermark information. Note that a watermark pixel may, for example, be any pixels not included in the position information adding regions. Alternatively, a watermark pixel may be set in any of the position information adding regions when any pixels in the picture are included in any of the position information adding regions. However, the positional relationship between a watermark pixel and each of the reference positions is fixed. For example, a watermark pixel is determined such that the horizontal coordinate difference and the vertical coordinate difference between the watermark pixel and each reference position are predetermined values.

Alternatively, the watermark information embedding unit 25 may set a subsection including a plurality of pictures for each bit included in digital watermark information within a section into which the digital watermark information is to be embedded. Then, the watermark information embedding unit 25 generates a watermark pattern to be superimposed on a watermark region set in each of the pictures in the subsection and periodically changes the area of the watermark pattern according to a bit value. In this case, the watermark information embedding unit 25 changes a phase of a periodic temporal variation or a period of a temporal variation of the area of the watermark pattern according to a value of the bit to be embedded. Thus, as the average pixel value in the watermark region, in which the watermark is included, set in a portion of a picture also periodically increases and decreases, the phase of the periodic temporal variation or the period of the temporal variation of the average pixel values within the watermark region also vary.

Note that a watermark region is set to include the watermark pattern with the maximum area and to have a certain size. In other words, a watermark region includes a region in which a watermark pattern is superimposed on a picture regardless of an area of a watermark pattern. In addition, the watermark region may, for example, be set in any region not included in position information adding regions. Alternatively, a watermark region may be set in any of position information adding regions if any of pixels in a picture is included in any of position information adding regions. In a case that a watermark region is set in a position information adding region, it is possible that the digital watermark detection apparatus is unable to detect a watermark pattern when a period of a pixel value variation in a temporal direction generated by a moving pattern moving in order to detect a reference position and a period of the watermark pattern are matched. Accordingly, it is preferable that the watermark information embedding unit 25 set a variation period in a temporal direction of a watermark pattern different from a period of a temporal direction of a moving pattern.

In this case, the positional relationship between the watermark region and the reference positions is also constant. For example, when a plurality of reference positions are set, a watermark region is determined such that the differences of horizontal and vertical coordinates between the center of the watermark region and the respective reference positions are set to be predetermined values.

FIG. 7 is a diagram illustrating an example of a temporal variation of one cycle of a watermark pattern. In this example, the watermark pattern includes a plurality of watermark blocks and pixels included in each of the watermark blocks have a negative value, for example, '−2'. Accordingly, each of the watermark blocks becomes shadow-like and, as a result, the values of the superimposed pixels are smaller than the original pixel values.

In FIG. 7, nine pictures successive in time from time t to time (t+8) are illustrated. A rectangle watermark pattern 711 is superimposed in a picture 701 at time t. The area of the watermark pattern superimposed in the picture decreases due to decrease in the number of watermark blocks as time elapses from time t to time (t+4). Then, the watermark pattern disappears in a picture 702 at time (t+4). Then, the area of the watermark pattern increases after time (t+4) and the area of the watermark pattern becomes maximum again in a picture 703 at time (t+8).

Figure 8:
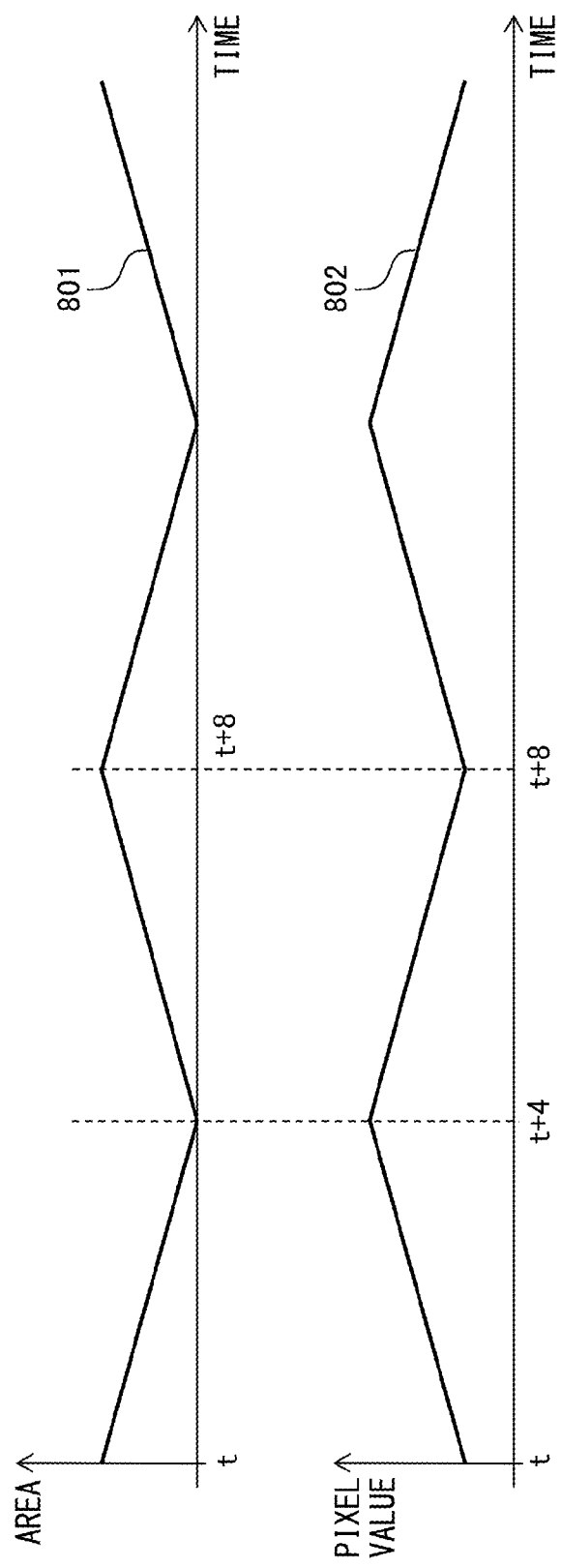
FIG. 8 is a graph depicting, in corresponding relationship to FIG. 7, a temporal variation of the area of the watermark pattern and a temporal variation of the average value of pixel values within a region including the watermark pattern.

FIG. 8 is a graph depicting the corresponding relationship between a temporal variation of the area of the watermark pattern and a temporal variation of the average value of pixel values within the region including the watermark pattern in corresponding to FIG. 7. The horizontal axis represents time and the vertical axis represents the area of the watermark pattern in the upper graph of FIG. 8. A graph 801 represents the area of the watermark pattern at each of times from t to (t+8). On the other hand, the horizontal axis represents time and the vertical axis represents a pixel value in the lower graph. A graph 802 represents the average pixel value within the watermark region at each of times from t to (t+8).

As is depicted in the graph 801, the area of the watermark pattern changes like a triangular waveform at times t to (t+8). In this example, each pixel of the watermark pattern has a negative value. Accordingly, as depicted in the graph 802, the average pixel value within the watermark region increases as the area of the watermark pattern decreases and conversely decreases as the area of the watermark pattern increases. Therefore, the average pixel value also changes like a triangular waveform along a time series, and the phase of the triangular waveform representing the variation of the average pixel value is reversed against the phase of the triangular waveform representing the variation of the area of the watermark pattern.

As has been described above as an example, a value of a bit to be embedded into video data is represented by a variation period of an area of a watermark pattern, i.e., a variation period of an average pixel value within a watermark region.

Figure 9:
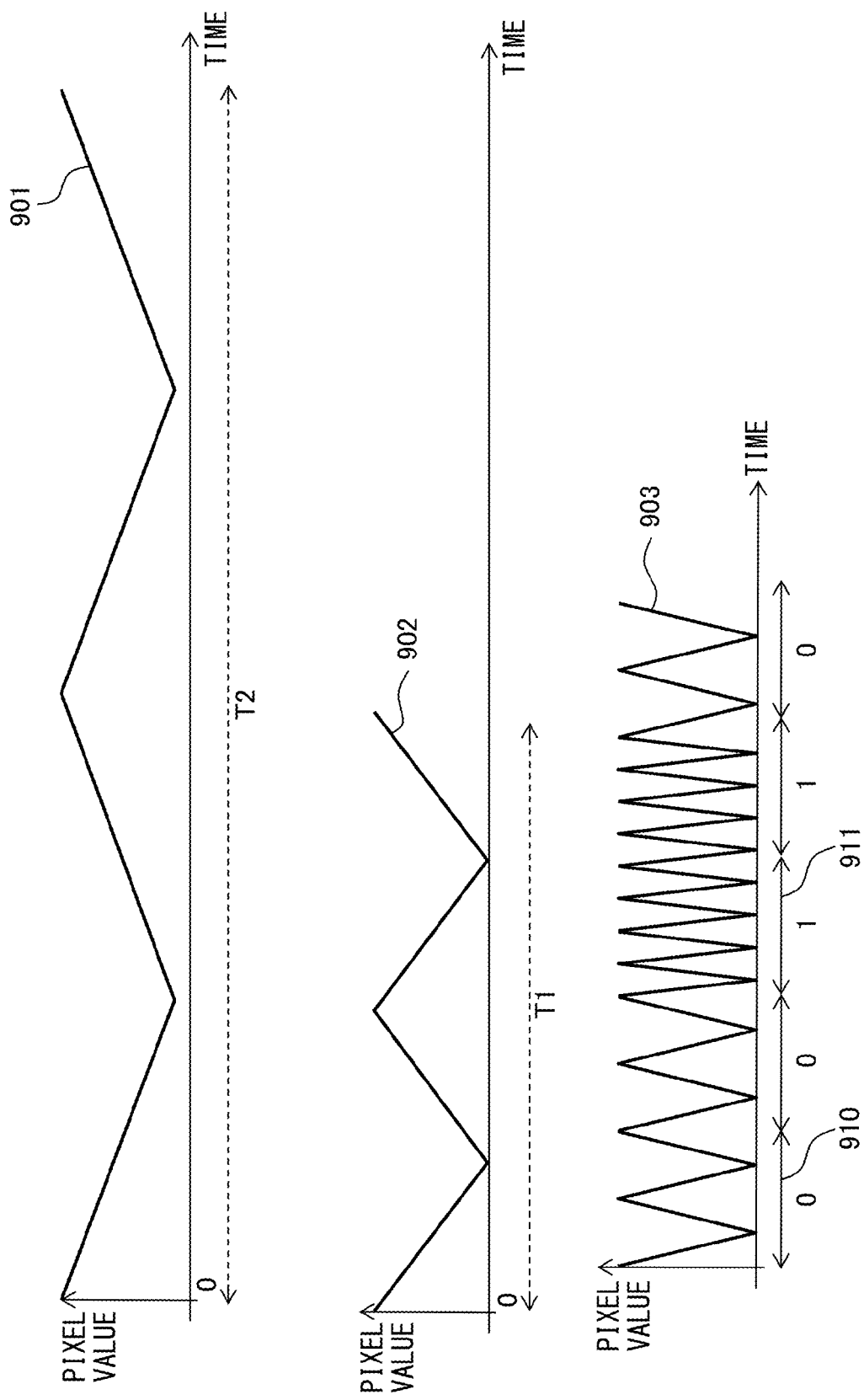
FIG. 9 is a diagram illustrating an example of the relationship between temporal variations of a watermark pattern and bit values to be embedded.

FIG. 9 is a diagram illustrating an example of the relationship between a temporal variation of a watermark pattern and a value of a bit to be embedded. In each of the graphs at an upper side, a center side, and a lower side of FIG. 9, the horizontal axis represents time and the vertical axis represents the average pixel value within a watermark region. Graphs 901 and 902 respectively represent variations of the average pixel values within the watermark region as time elapses for cases that bit values are '0' and '1'. In this example, a period T1 representing a bit value of '1' is a half of a period T2 representing a bit value of '0'. Note that a length of a section into which one bit is embedded is preferably the same regardless of bit values. For example, as illustrated in a graph 903 in FIG. 9 representing a temporal variation of the average pixel value within a watermark region for a plurality of bits, one section 910 includes two periods of a variation of the average pixel value when a bit value is '0', while one section 911 includes four periods of a variation of the average pixel value when a bit value is '1'.

Alternatively, a value of a bit to be embedded into video data may be represented by a phase of a temporal variation of an area of a watermark pattern. For example, the watermark information embedding unit 25 may reverse a phase of a temporal variation of an area of a watermark pattern for a bit value of '1' against the phase of the temporal variation of the area of the watermark pattern for a bit value of '0'.

The watermark information embedding unit 25 sets a watermark region for each picture. In addition, the watermark information embedding unit 25 modifies values of pixels on a picture overlapping with pixels included in a watermark pattern with the values of the pixels included in the watermark pattern. For example, when each pixel included in a watermark pattern has a value of '−2', the watermark information embedding unit 25 subtracts '2' from a value of each pixel included in a region overlapping with the watermark pattern. Conversely, when each pixel included in a watermark pattern has a value of '2', the watermark information embedding unit 25 adds '2' to a value of each pixel included in a region overlapping with the watermark pattern.

As described above, the watermark information embedding unit 25 may embed a plurality of bits into video data in a time series direction. In this case, every time when a section corresponding to one bit to be embedded into video data ends, the watermark information embedding unit 25 may superimpose a predetermined pattern indicating a punctuation of each bit in pictures until a section corresponding to the next bit begins.

Alternatively, the watermark information embedding unit 25 may embed a plurality of bits included in digital watermark information into each picture of video data. For example, a plurality of watermark pixels in each picture are used for representing values of bits included in the digital watermark information. A plurality of watermark regions and a watermark pattern included in each of the watermark regions are set in each picture of video data. Each watermark region and a watermark pattern to be superimposed in the watermark region correspond to one bit.

The watermark information embedding unit 25 embeds digital watermark information into video data as described above. Then, the watermark information embedding unit 25 stores the video data with the embedded watermark information in the storage unit 12. Alternatively, the watermark information embedding unit 25 may output the video data with the embedded watermark information to other devices through the interface unit 11.

Figure 10:
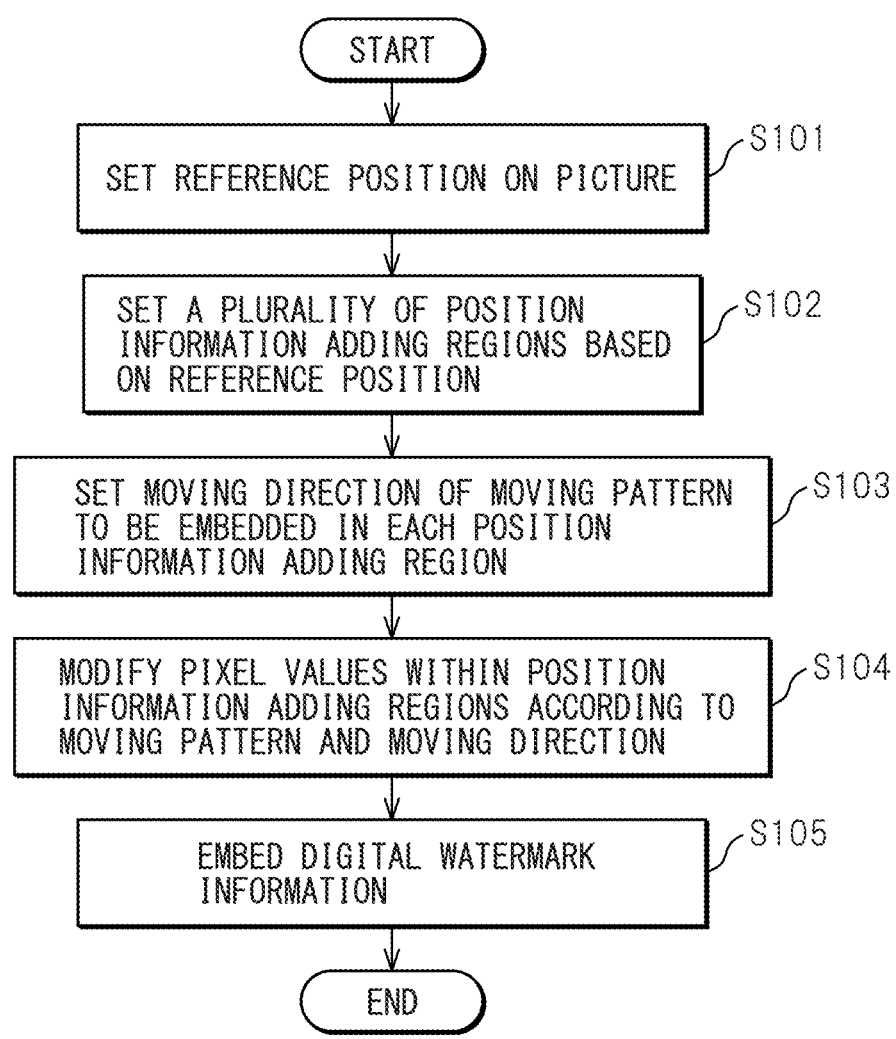
FIG. 10 is an operation flowchart illustrating a position information adding process performed under the control of a computer program executed on a processing unit of the position information adding apparatus.

FIG. 10 is an operation flowchart illustrating a digital watermark embedding process performed under the control of a computer program executed on the processing unit of the digital watermark embedding apparatus according to the present embodiment.

The reference position setting unit 21 of the processing unit 13 sets at least one reference position on a picture (step S101). Then the reference position setting unit 21 notifies the region setting unit 22 of information representing each reference position. The region setting unit 22 sets a plurality of position information adding regions based on the reference position (step S102). Then the region setting unit 22 notifies the movement setting unit 23 of information representing each position information adding region.

The movement setting unit 23 sets a moving direction of a moving pattern to be embedded into each position information adding region (step S103). Then the movement setting unit 23 notifies the position information embedding unit 24 of information representing the moving direction of the moving pattern for each position information adding region. The position information embedding unit 24 modifies values of pixels within the position information adding regions according to the moving pattern and the moving direction for a plurality of pictures included in a predetermined section into which the digital watermark information is to be embedded (step S104). Then, the position information embedding unit 24 passes the pictures with the embedded moving pattern to the watermark information embedding unit 25.

The watermark information embedding unit 25 embeds the digital watermark information into the pictures with the embedded moving pattern (step S105). Then, the processing unit 13 terminates the digital watermark embedding process. Note that the processing unit 13 may perform the processes of the steps S101 to S104 after performing the process of the step S105.

As has been described above, a digital watermark embedding apparatus according to the first embodiment embeds a moving pattern, the position thereof moving corresponding to time elapse, into each picture in order to identify reference positions which serve as references for positions into which digital watermark information is to be embedded. Therefore, the digital watermark detection apparatus can identify the reference positions by finding the moving pattern even in re-captured video data obtained by capturing, using a video camera or the like, video data into which the digital watermark embedding apparatus embedded digital watermark information. Therefore, outer edges of pictures in an original video data may not be captured on pictures of the re-captured video data in order to identify reference positions. Furthermore, it is possible to identify reference positions by detecting a moving pattern even when a camera shake occurs when re-shooting the video data with embedded watermark information. The digital watermark detection apparatus may identify watermark pixels or watermark regions with embedded watermark information once reference positions are identified. Hence, the digital watermark embedding apparatus can add, for re-captured video data, position information by which positions where digital watermark information is embedded in each picture of the re-captured video data can be identified In the following, description will be given on a digital watermark detection apparatus for detecting digital watermark information which the digital watermark embedding apparatus according to the first embodiment has embedded into video data.

Figure 11:
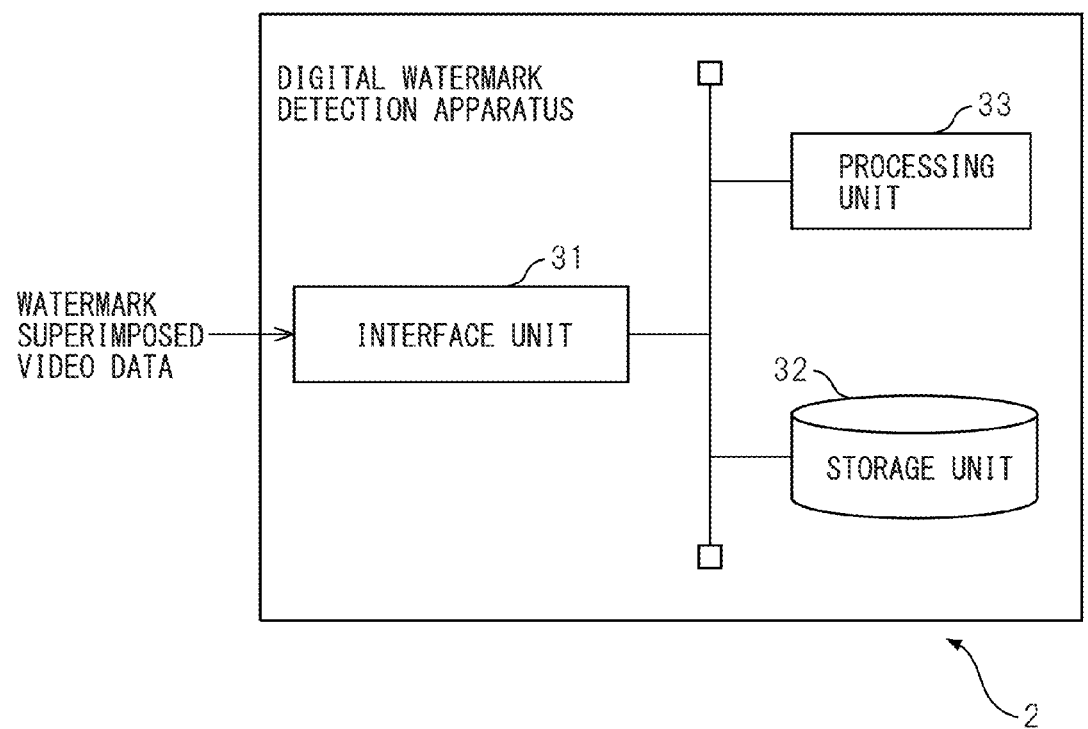
FIG. 11 is a diagram illustrating in simplified form the configuration of a digital watermark detection apparatus according to a second embodiment.

FIG. 11 is a diagram illustrating in simplified form the configuration of a digital watermark detection apparatus according to a second embodiment. The digital watermark detection apparatus 2 includes an interface unit 31, a storage unit 32, and a processing unit 33. The digital watermark detection apparatus 2 detects reference positions of each picture of video data obtained through the interface unit 31 and then detects embedded digital watermark information by analyzing values of watermark pixels or pixels in watermark regions identified based on the reference positions.

Note that a digital watermark detection apparatus according to each of embodiments or variations thereof described in the following is an example of position detection apparatus. Furthermore, video data into which digital watermark information is embedded is referred to as watermark superimposed video data in the following description.

The interface unit 31 includes, for example, a signal interface and a control circuit thereof for connecting the digital watermark detection apparatus 2 to a video data input device (not depicted) such as a video camera. Alternatively, the interface unit 31 may include a communication interface and a control circuit thereof for connecting the digital watermark detection apparatus 2 to a communication network conforming to a communication standard such as the Ethernet (registered trade mark). The interface unit 31 obtains watermark superimposed video data through the video data input device or the communication network and passes the watermark superimposed video data to the processing unit 33. In addition, the interface unit 31 may receive the detected digital watermark information from the processing unit 33 and transmit the digital watermark information to other devices connected to the digital watermark detection apparatus 2.

The storage unit 32 includes, for example, at least one among a semiconductor memory device, a magnetic disk device, and an optical disk device. The storage unit 32 stores a computer program to be executed on the digital watermark detection apparatus 2 and various parameters used for detecting digital watermark information from watermark superimposed video data. In addition, the storage unit 32 may store detected digital watermark information. Further, the storage unit 32 may store watermark superimposed video data.

The processing unit 33 includes one or a plurality of processors, a memory circuit such as a random access memory, and a peripheral circuit. The processing unit 33 obtains a reference position by detecting a moving direction of a moving pattern embedded into each picture of watermark superimposed video data and identifies a watermark pixel or a watermark region based on the reference position. Then, the processing unit 33 detects watermark information. In addition, the processing unit 33 controls the entire digital watermark detection apparatus 2.

Figure 12:
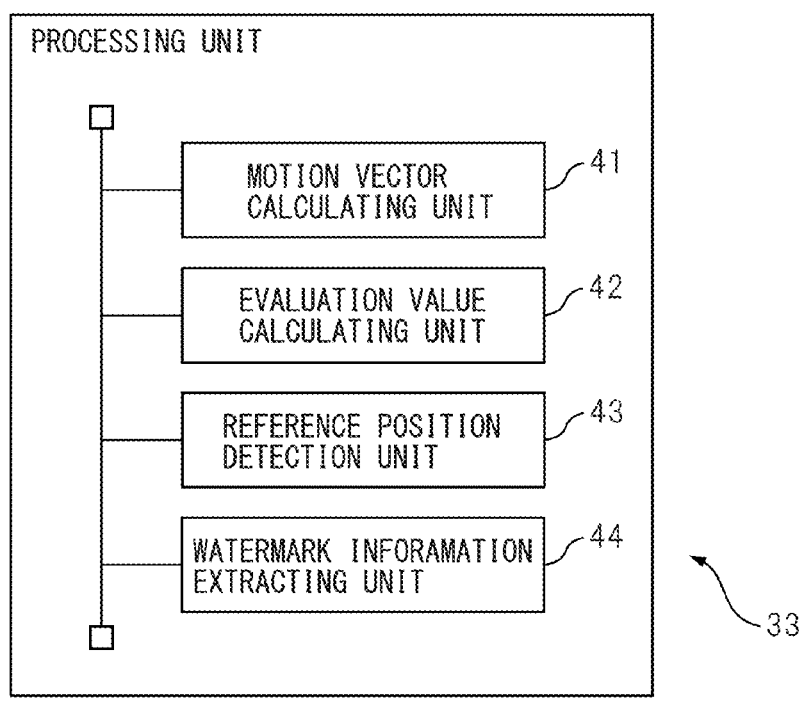
FIG. 12 is a block diagram illustrating functions of a processing unit of the digital watermark detection apparatus according to the second embodiment.

FIG. 12 is a block diagram illustrating functions of a processing unit which is implemented in order to detect a reference position and digital watermark information from superimposed video data.

The processing unit 33 includes a motion vector calculating unit 41, an evaluation value calculating unit 42, a reference position detection unit 43, and a watermark information extracting unit 44.

Every time when a picture of watermark imposed video data is obtained, the motion vector calculating unit 41 calculates a motion vector representing a move quantity and a moving direction of a figure captured in each pixel from a current picture which is the latest picture and past pictures. Note that the motion vector calculating unit 41 is an example of a feature extracting unit.

According to the following equation, for example, the motion vector calculating unit 41 calculates an absolute difference value $d(x,y,v_x,v_y,t)$ of a value of a pixel between each pixel of a picture (a current picture) at time t and a pixel shifted by the number of pixels corresponding to a motion vector candidate of a picture at time (t−1).

$$d(x,y,v_x,v_y,t)=|G(x,y,t)-G(x-v_x,y-v_y,t-1)| \qquad (4)$$

Where $G(a,b,t)$ is a pixel value at a horizontal coordinate a and a vertical coordinate b of a picture at time t. vx and vy are respectively a horizontal direction component and a vertical direction component of the motion vector candidate. Where the absolute difference value $d(x,y,v_x,v_y,t)$ ideally becomes 0 when $(v_x,v_y)$ represents a motion vector of a figure captured at a coordinate (x,y). Therefore, the motion vector calculating unit 41 obtains, as a motion vector of a pixel at the coordinate (x,y), the motion picture candidate $(v_x,v_y)$ which makes an evaluation value obtained based on the absolute difference value minimum.

As described above, the absolute value of the second term of the right hand side of the equation (2) is set to be a small value, for example, 3 or less such that the moving pattern is difficult to be perceived. Accordingly, when the absolute difference value $d(x,y,v_x,v_y,t)$ is larger than the absolute value of the second term of the right hand side of the equation (2), the difference value is unlikely attributable to the embedded moving pattern but is very likely attributable to edges of a figure captured on the original picture. Therefore, it is preferable that such a large absolute difference value d(x,y,$v_x$,$v_y$,t) be not considered with regard to calculation of a motion vector of an embedded moving pattern. Thus, the motion vector calculating unit 41 may calculate an absolute difference value d'(x,y,$v_x$,$v_y$,t) according to the following equation in place of the equation (4).

$$d'(x, y, v_x, v_y, t) = \begin{cases} d(x, y, v_x, v_y, t) & \text{if } d(x, y, v_x, v_y, t) \leq W\max \\ 0 & \text{if } d(x, y, v_x, v_y, t) > W\max \end{cases} \quad (5)$$

Where Wmax is an upper limit of the absolute difference value to consider in order to calculate the motion vector and is set to be the maximum value of the second term of the right hand side of the equation (2) or to be a value obtained by adding a predetermined offset value (for example, 1 or 2) to the maximum value. In this example, the motion vector calculating unit 41 calculates the motion vector using the absolute difference value calculated according to the equation (5).

The motion vector calculating unit 41 calculates an evaluation value D(x,y,$v_x$,$v_y$,t) of the motion vector candidate ($v_x$,$v_y$) according to the following equation for each pixel of the current picture while variously changing each component of the motion vector candidate ($v_x$,$v_y$) within a predetermined range for the motion vector candidate.

$$D(x, y, v_x, v_y, t) = \sum_{x'=x-R}^{x+R} \sum_{y'=y-R}^{y+R} d'(x', y', v_x, v_y, t) \quad (6)$$

Note that R is a parameter representing a size of a search block of a motion vector to be set around a pixel of interest and the search block consists of (2R+1) pixels horizontally times (2R+1) pixels vertically. For example, R is set to be 4, 8, or 16.

The motion vector calculating unit 41 obtains, as a motion vector, a candidate for which the evaluation value D(x,y,$v_x$,$v_y$,t) becomes minimum among motion vector candidates ($v_x$,$v_y$). In other words, assuming that a range of motion vector candidates is V, a motion vector (Vx(x,y,t), Vy(x,y,t)) can be obtained as follows.

$$(V_x(x, y, t), V_y(x, y, t)) = \underset{(v_x, v_y) \in V}{\arg \min} D(x, y, v_x, v_y, t) \quad (7)$$

Note that the right hand side of the equation (7) represents a candidate for which the evaluation value D(x,y,$v_x$,$v_y$,t) becomes minimum among motion vector candidates ($v_x$,$v_y$) included in the range V. A range of the motion vector candidates is set to, for example, a range corresponding to the maximum value of a move quantity of a moving pattern between successive two pictures. The motion vector calculating unit 41 passes the motion vector obtained for each pixel of the current picture to the evaluation value calculating unit 42.

The evaluation value calculating unit 42 calculates a reference position evaluation value representing a likelihood of being a reference position for each pixel of the current picture. In the present embodiment, the positional relationship between a reference position and a position information adding region and a motion vector of a moving pattern embedded into a position information adding region are known to the digital watermark detection apparatus 2.

Accordingly, a reference pattern, which is determined with respect to a reference position as being the origin, representing a motion vector of each pixel included in a position information adding region is obtained and the reference pattern is stored in the storage unit 32 in advance.

Then the evaluation value calculating unit 42 calculates, for each pixel of the current picture, a reference position evaluation value of the pixel by pattern matching between a moving pattern of the pixel and surrounding pixels thereof and the reference pattern. For example, the evaluation value calculating unit 42 calculates, as a reference position evaluation value E(x,y,t) of the pixel at horizontal coordinate x and vertical coordinate y of the picture at time t, a normalized cross-correlation value between a motion vector of a pixel of interest and surrounding pixels thereof and a motion vector of each pixel within the reference pattern as illustrated in the following equation.

$$E(x, y, t) = \frac{\sum_{x'=-S}^{S} \sum_{y'=-S}^{S} (V_x(x+x', y+y', t)R_x(x', y') + V_y(x+x', y+y', t)R_y(x', y'))}{V_{abs}(x, y, t)R_{abs}} \quad (8)$$

Where (Rx(x,y),Ry(x,y)) represents a horizontal direction component and a vertical direction component of a motion vector of a moving pattern in a position information adding region in which a pixel(x,y) of a reference pattern is included. (Vx(x,y),Vy(x,y)) represents a horizontal direction component and a vertical direction component of a moving pattern in a pixel(x,y) of the current picture. S is a parameter representing the size of a reference pattern and in this example the reference pattern includes (2S+1) pixels horizontally and (2S+1) pixels vertically. Vabs(x,y,t) and Rabs are represented by the following equations.

$$V_{abs}(x, y, t) = \sqrt{\sum_{x'=-S}^{S} \sum_{y'=-S}^{S} (V_x(x+x', y+y', t)V_y(x+x', y+y', t))} \quad (9)$$

$$R_{abs} = \sqrt{\sum_{x'=-S}^{S} \sum_{y'=-S}^{S} (R_x(x', y')R_y(x', y'))}$$

The reference position evaluation value E(x,y,t) of a pixel of interest becomes high as a degree of matching between a motion vector of a moving pattern in a position information adding region having a predetermined positional relationship with a reference position and a motion vector of a pixel in a region having the predetermined positional relationship with the pixel of interest of the current picture becomes high. The reference position evaluation value E(x,y,t) becomes 1 when a distribution of the motion vector of the pixel of interest and surrounding pixels thereof of the current picture and a distribution of the motion vector of the reference pattern entirely match. The evaluation value calculating unit 42 passes the reference position evaluation value of each pixel of the current picture to the reference position detection unit 43.

The reference position detection unit 43 detects a reference position based on the reference position evaluation value of each pixel of the current picture. In the present embodiment, the reference position detection unit 43 sets, as one reference position, a pixel at which the reference position evaluation value E(x,y,t) becomes maximum. In addition, the reference position detection unit 43 detects, as another reference position, a pixel at which the reference position evaluation value E(x,y,t) becomes maximum in a remaining region excluding a predetermined range centered on the reference position detected previously. Thereafter, similarly, the reference position detection unit 43 detects, as a reference position, a pixel at which the reference position evaluation value E(x,y,t) becomes maximum in a remaining region excluding the predetermined range centered on each of the reference positions detected previously. The reference position detection unit 43 repeats the execution of detection of reference positions by the number of reference positions set in the picture. Note that the predetermined range is, for example, a circular region with the center at a detected reference position and the radius of a half of the distance between two reference positions between which a distance becomes minimum.

The reference position detection unit 43 may terminate the detection of reference positions when the maximum value of the reference position evaluation value E(x,y,t) in the remaining region becomes less than a predetermined threshold value. For example, the threshold value may be set to be a half of the maximum value that the reference position evaluation value E(x,y,t) can take.

Figure 13A:
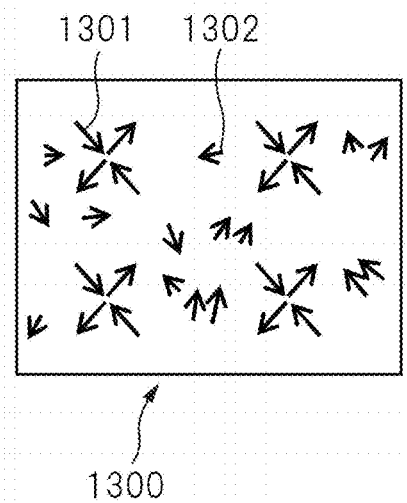
FIG. 13A is a conceptual diagram of motion vectors obtained from the picture into which the moving patterns illustrated in FIG. 4A and FIG. 5A are embedded.
Figure 13B:
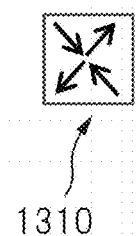
FIG. 13B is a conceptual diagram of a reference pattern corresponding to the moving pattern embedded into four position information adding regions set in the surrounding of one of the reference positions illustrated in FIG. 4A and FIG. 5A.
Figure 13C:
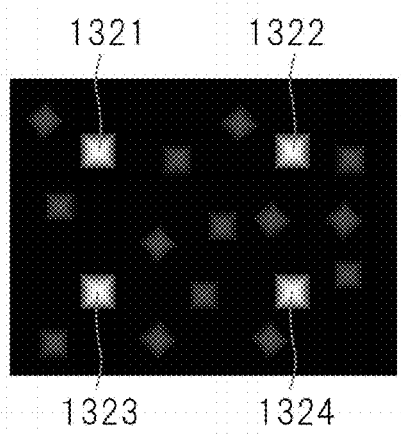
FIG. 13C is a diagram depicting reference position evaluation values obtained for each pixel of the picture.
Figure 13D:
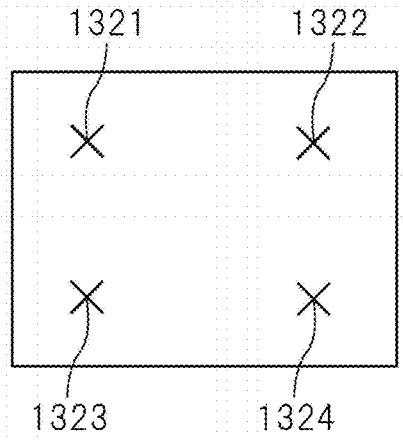
FIG. 13D is a diagram depicting detected reference positions corresponding to FIG. 13C.

FIG. 13A is a conceptual diagram of motion vectors obtained from the picture into which the moving patterns illustrated in FIG. 4A and FIG. 5A are embedded. FIG. 13B is a conceptual diagram of a reference pattern corresponding to the moving pattern embedded into four position information adding regions set in the surrounding of one of the reference positions illustrated in FIG. 4A and FIG. 5A. FIG. 13C is a diagram depicting reference position evaluation values obtained for each pixel of the picture. FIG. 13D is a diagram depicting detected reference positions corresponding to FIG. 13C. Note that arrows illustrated in FIG. 13A and FIG. 13B represent motion vectors. In FIG. 13C, a pixel having a higher reference position evaluation value is represented whiter.

As illustrated in FIG. 13A, in a picture 1300, not only a motion vector 1301 attributable to an embedded moving pattern, but also a motion vector 1302 attributable to figures or watermark patterns captured on the picture 1300 are detected. However, a distribution of motion vectors around a reference position is similar to a distribution of motion vectors included in the reference pattern 1310 illustrated in FIG. 13B. Accordingly, as illustrated in FIG. 13C, reference position evaluation values at reference positions 1321 to 1324 are higher than reference position evaluation values at other pixels. Therefore, as illustrated in FIG. 13D, the reference position detection unit 43 can accurately detect each of the reference positions 1321 to 1324 by detecting four points having high reference position evaluation values.

Note that, according to a modified embodiment, the evaluation value calculating unit 42 and the reference position detection unit 43 may calculate reference position evaluation values for each row and each column of the current picture based on known statistical properties of a distribution of motion vectors and detect reference positions based on the reference position evaluation values.

Referring to FIG. 14A to FIG. 14E, detection of reference positions is described. It is assumed that the two moving patterns depicted in FIG. 4B and FIG. 5B are embedded into a current picture 1400 illustrated in FIG. 14A. In FIG. 14A, each arrow on the current picture 1400 represents a motion vector at the position of the arrow.

In this case, as illustrated in FIG. 14A, as the moving pattern moves from lower right to upper left in a position information adding region 1411 located in a central area, a large number of pixels with the motion vector having the direction from lower right to upper left are distributed. Similarly, as the moving pattern moves from upper left to lower right in a position information adding region 1412 located in a surrounding area, a large number of pixels with the motion vector having the direction from upper left to lower right are distributed. The evaluation value calculating unit 42 analyzes a distribution for each row and column of pixels having the moving pattern moving from upper left to lower right in the current picture 1400 and a distribution for each row and column of pixels having the moving pattern moving from lower right to upper left.

First, the evaluation value calculating unit 42 obtains the number of pixels with the motion vector having the direction from upper left to lower right for each row, i.e., the frequency of the motion vector having the direction from upper left to lower right. Similarly, the evaluation value calculating unit 42 obtains the number of pixels with the motion vector having the direction from lower right to upper left for each row. In addition, the evaluation value calculating unit 42 obtains the number of pixels with the motion vector having the direction from upper left to lower right for each column. Similarly, the evaluation value calculating unit 42 obtains the number of pixels with the motion vector having the direction from lower right to upper left for each column.

A graph 1421 illustrated in FIG. 14B is a graph representing the number of pixels with the motion vector having the direction from upper left to lower right for each row. The horizontal axis represents the number of pixels and the vertical axis represents the vertical position on the picture 1400. A graph 1422 is a graph representing the number of pixels with the motion vector having the direction from lower right to upper left for each row, the horizontal axis represents the number of pixels, and the vertical axis represents the vertical position on the picture 1400. It is clearly understood from the graphs 1421 and 1422 that motion vectors with high frequencies are exchanged at vertical positions 1431 and 1432. In other words, the frequency of the motion vector having the direction from upper left to lower right is high in the upper side of the vertical position 1431 and in the lower side of the vertical position 1432. On the other hand, the frequency of the motion vector having the direction from lower right to upper left is high in the area sandwiched by the vertical positions 1431 and 1432. Accordingly, it is estimated that the vertical positions 1431 and 1432 respectively represent the boundaries of the position information adding regions 1411 and 1412. Then the evaluation value calculating unit 42 sets, for each row or column of the current picture, first and second regions bounded by the row or the column. The evaluation value calculating unit 42 obtains reference position evaluation values according to the number of pixels, included in the first region, with the motion vector having the same direction as that of the motion vector in one of the position information adding regions and the number of pixels, included in the second region, with the motion vector having the same direction as that of the motion vector in another of the position information adding regions.

For example, the evaluation value calculating unit 42 sets, as y1', a candidate at the lower-side boundary position of the position information adding regions and sets, as y2', a candidate at the upper-side boundary position of the position information adding regions (where y1'<y2', assuming that the upper left end be the origin). In this case, the average value of the frequencies for each row of the motion vector having the direction from upper left to lower right distributed in a region outside of the candidates of the two boundary positions is set as A(y1',y2') and the average value of the frequencies for each row of the motion vector having the direction from lower right to upper left distributed in a region sandwiched by the candidates of the two boundary positions is set as B(y1',y2'). Then the reference position evaluation value for row(y1',y2') becomes [A(y1',y2')+B(y1',y2')].

Similarly, the evaluation value calculating unit 42 sets, as x1', a candidate of the left-side boundary position of the position information adding regions and sets, as x2', a candidate of the right-side boundary position of the position information adding regions (where x1'<x2', assuming that the upper left end be the origin). In this case, the average value of the frequencies for each column of the motion vector having the direction from upper left to lower right distributed in a region outside of the candidates of the two boundary positions is set as C(x1',x2') and the average value of the frequencies for each column of the motion vector having the direction from lower right to upper left distributed in a region sandwiched by the candidates of the two boundary positions is set as D(x1',x2'). Then the reference position evaluation value for column(x1',x2') becomes [C(x1',x2')+D(x1',x2')]. The evaluation value calculating unit 42 notifies the reference position detection unit 43 of the reference position evaluation value of each row and column.

The reference position detection unit 43 obtains, as the respective boundary position of the position information adding regions, the row and column in which the reference position evaluation value becomes maximum. In this example, the boundary positions (y1,y2) of the upper and lower sides of the position information adding region 1411 are obtained by the following equation.

$$(y_1, y_2) = \arg\max_{(y'_1, y'_2)} [A(y'_1, y'_2) + B(y'_1, y'_2)] \quad (10)$$

Note that the right hand side of the equation (10) is a function which outputs, among sets of (y1',y2'), a set corresponding to the maximum value of [A(y1',y2')+B(y1', y2')]. As a result, boundaries 1441 and 1442 of the vertical direction of the position information adding regions are obtained as illustrated in FIG. 14C.

Similarly, the boundary positions (x1,x2) of the left and right sides of the position information adding region 1411 are obtained by the following equation.

$$(x_1, x_2) = \arg\max_{(x'_1, x'_2)} [C(x'_1, x'_2) + D(x'_1, x'_2)] \quad (11)$$

Note that the right hand side of the equation (11) is a function which outputs, among sets of (x1',x2'), a set corresponding to the maximum value of [C(x1',x2')+D(x1', x2')]. As a result, the boundary positions 1451 and 1452 of the horizontal direction of the position information adding region are obtained as illustrated in FIG. 14D.

As illustrated in FIG. 14E, the reference position detection unit 43 detects, as respective reference positions 1461 to 1464, intersections of the boundaries 1441 and 1442 of the horizontal direction of the position information adding regions and the boundaries 1451 and 1452 of the vertical direction of the position information adding regions.

Figure 15:
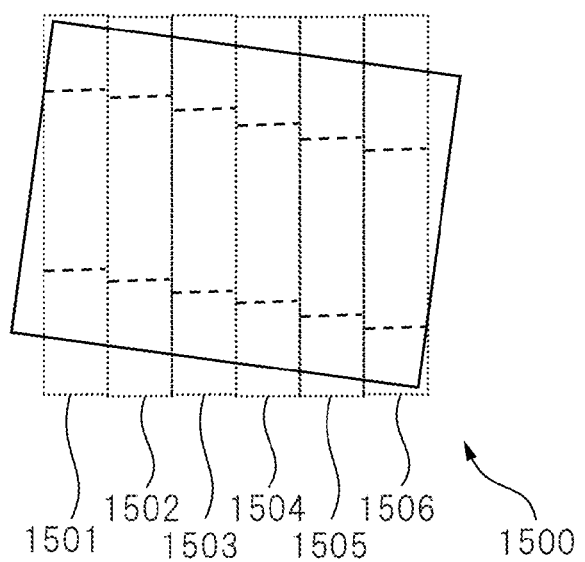
FIG. 15 is a diagram illustrating an example of blocks defined for a picture.

Note that, when watermark superimposed video data is re-captured video data, the original picture may be captured at an angle on each picture of the re-captured video data. In this case, boundary lines of a position information adding region is also at an angle with respect to the original boundary lines. As illustrated in FIG. 15, the evaluation value calculating unit 42 may divide a picture included in the re-captured video data into a plurality of blocks and calculate frequencies of motion vector having a specific direction of a row or column for each block. For example, in FIG. 15, a picture 1500 is divided into six blocks 1501 to 1506 along a horizontal direction. The evaluation value calculating unit 42 obtains, as a reference position evaluation value, a frequency of a motion vector having the direction from lower right to upper left and a frequency of a motion vector having the direction from upper left to lower right of each row for each block. Similarly, when calculating a frequency of a motion vector for each column, the evaluation value calculating unit 42 may divide the picture into a plurality of blocks along a vertical direction and calculate a frequency of a motion vector of each column for each of the blocks.

In this case, the reference position detection unit 43, from a frequency distribution for each row of the motion vector calculated for each of a plurality of blocks into which the picture is divided along the horizontal direction, obtains a coordinate of the vertical direction of a boundary position of a position information adding region for each of the blocks based on the equation (10). In addition, the reference position detection unit 43 sets, for example, the horizontal coordinate of a boundary position of each of the blocks as a coordinate of the midpoint of the horizontal direction of the block. Then the reference position detection unit 43 obtains a boundary line of the position information adding region of an approximately horizontal direction by applying the least square method to the boundary position of each of the blocks. Similarly, the reference position detection unit 43, from a frequency distribution for each column of the motion vector calculated for each of a plurality of blocks into which the picture is divided along the vertical direction, obtains a coordinate of the horizontal direction of a boundary position of the position information adding region for each of the blocks based on the equation (11). In addition, the reference position detection unit 43 sets, for example, the vertical coordinate of the boundary position of each of the blocks as a coordinate of the midpoint of the vertical direction of the block. Then the reference position detection unit 43 obtains a boundary line of the position information adding region of an approximately vertical direction by applying the least square method to the boundary position of each of the blocks. Then the reference position detection unit 43 sets, as a reference point, an intersection of the boundary line of the approximately horizontal direction and the boundary line of the approximately vertical direction.

Alternatively, the evaluation value calculating unit 42 may also obtain a frequency distribution of a motion vector having a specific direction for each row and each column for the entire picture for watermark superimposed video data which is re-captured video data. In this case, the reference position detection unit 43 obtains approximate positions of boundaries of the position information adding region based on the equation (10) or (11).

Then, in order to obtain accurate boundary lines of the position information adding region of the approximate horizontal direction, the reference position detection unit 43 sets, for example, a boundary candidate point near a broad boundary position for a row near the midpoint of the horizontal direction of the picture. Then, while shifting the position of the boundary candidate point vertically, the reference position detection unit 43 obtains an inner product of a motion vector of a pixel adjacent to the upper side of the boundary candidate point and a motion vector of a pixel adjacent to the lower side of the boundary candidate point for each boundary candidate point. When the boundary candidate point is positioned at the true boundary of the position information adding region, the inner product of the vectors becomes minimum since the directions of the motion vectors of the upper and lower sides of the boundary candidate point are different. The reference position detection unit 43 detects, as a point located on the true boundary of the position information adding region, a boundary candidate point at which the inner product becomes minimum. Thereafter, in the same manner as described above, the reference position detection unit 43, while shifting the column one by one, detects, as a point located on the true boundary of the position information adding region, a boundary candidate point at which the inner product of a motion vector of a pixel adjacent to the upper side and a motion vector of a pixel adjacent to the lower side becomes minimum. Thus, the reference position detection unit 43 obtains a set of points on the boundary as a boundary line of the position information adding region of the approximate horizontal direction.

Similarly, the reference position detection unit 43 sets a boundary candidate point near a broad boundary position for a column near the midpoint of the vertical direction of a picture. Then, while shifting the position of the boundary candidate point horizontally, the reference position detection unit 43 obtains, for each of the boundary candidate points, an inner product of a motion vector of a pixel adjacent to the left side of the boundary candidate point and a motion vector of a pixel adjacent to the right side of the boundary candidate point. The reference position detection unit 43 detects a boundary candidate point at which the inner product becomes minimum as a point on the true boundary of the position information adding region. By successively detecting, as a point on the true boundary of the position information adding region, a boundary candidate point at which the inner product of a motion vector of a pixel adjacent to the left side and a motion vector of a pixel adjacent to the right side becomes minimum while shifting the row one by one, the reference position detection unit 43 obtains a boundary line of the approximate vertical direction of the position information adding region. Again, the reference position detection unit 43 sets, as a reference point, an intersection of the boundary line of the approximately horizontal direction and the boundary line of the approximately vertical direction. The reference position detection unit 43 notifies the watermark information extracting unit 44 of a coordinate of each of the reference positions.

The watermark information extracting unit 44 identifies watermark pixels or watermark regions into which watermark information is embedded based on the reference points, and extracts the embedded digital watermark information by analyzing values of the watermark pixels or the watermark regions. For example, the watermark information extracting unit 44 detects, as a watermark pixel or the center of a watermark region, a pixel on the current picture at which a ratio of a distance to a plurality of pixels detected as the reference positions and a ratio of a distance from each of the reference positions on the original picture to the watermark pixel or the center of the watermark region are equal. For example, when a watermark pixel is set at the midpoint between two of the reference positions, the watermark information extracting unit 44 sets, as a watermark pixel, the midpoint between two pixels detected as the reference positions by the reference position detection unit 43.

When a watermark pixel of the current picture has a value corresponding to a bit value included in a digital watermark information, the watermark information extracting unit 44 detects a bit value corresponding to the watermark pixel value.

When a value of each bit included in digital watermark information is represented by a periodic variation of an area of a watermark pattern superimposed in each picture of watermark superimposed video data, the watermark information extracting unit 44 calculates the average pixel value within a watermark region of each picture. Note that, when a plurality of watermark regions are set in a single picture, the watermark information extracting unit 44 calculates the average pixel value of each of the watermark regions.

The watermark information extracting unit 44 generates a one-dimensional vector for each watermark region in which the average pixel values within the watermark region are arranged in chronological order. Then the watermark information extracting unit 44 transforms the one-dimensional vector into a frequency domain in a unit of a section corresponding to one bit and obtains a spectrum for temporal variation of the average pixel value in the section. Note that, for example, a fast Fourier transform or a discrete cosine transform may be used for the frequency transformation. In addition, by detecting a predetermined pattern representing a break of a section through, for example, a pattern matching, the watermark information extracting unit 44 may identify the section.

The watermark information extracting unit 44 extracts only a frequency component from a spectrum of each section with respect to each watermark region, the frequency component corresponding to a temporal variation of the average pixel value within a watermark region due to a periodic variation of the area of a watermark pattern. When a value of an embedded bit is represented by a phase of a temporal variation of the average pixel value within a watermark region, the watermark information extracting unit 44 obtains phase information from the extracted frequency component. Then the watermark information extracting unit 44 obtains a value of a bit corresponding to the phase by, for example, referring to a mapping table representing the relationship between a phase and a value of a symbol.

When a bit value is represented by a period of a temporal variation of a watermark pattern area, the watermark information extracting unit 44 obtains the strongest frequency component among frequency components corresponding to each of values which a bit can take and obtains a period corresponding to the strongest frequency component. Then the watermark information extracting unit 44 sets, as a value of the embedded bit, a bit value corresponding to the detected period, referring to a mapping table representing the relationship between a period and a bit value. The mapping tables are stored in the storage unit 32 in advance and the processing unit 33 uses by retrieving the mapping table from the storage unit 32.

The watermark information extracting unit 44 reproduces the watermark information by arranging the extracted bit values in a predetermined order, for example, a chronological order. When a plurality of bits are embedded into one picture of watermark superimposed video data, the watermark information extracting unit 44 reproduces the watermark information by arranging a value of each bit according to a predetermined order of bits embedded into the picture.

The watermark information extracting unit 44 stores the watermark information in the storage unit 32. Alternatively, the watermark information extracting unit 44 may output the watermark information to other devices through the interface unit 31.

Figure 16:
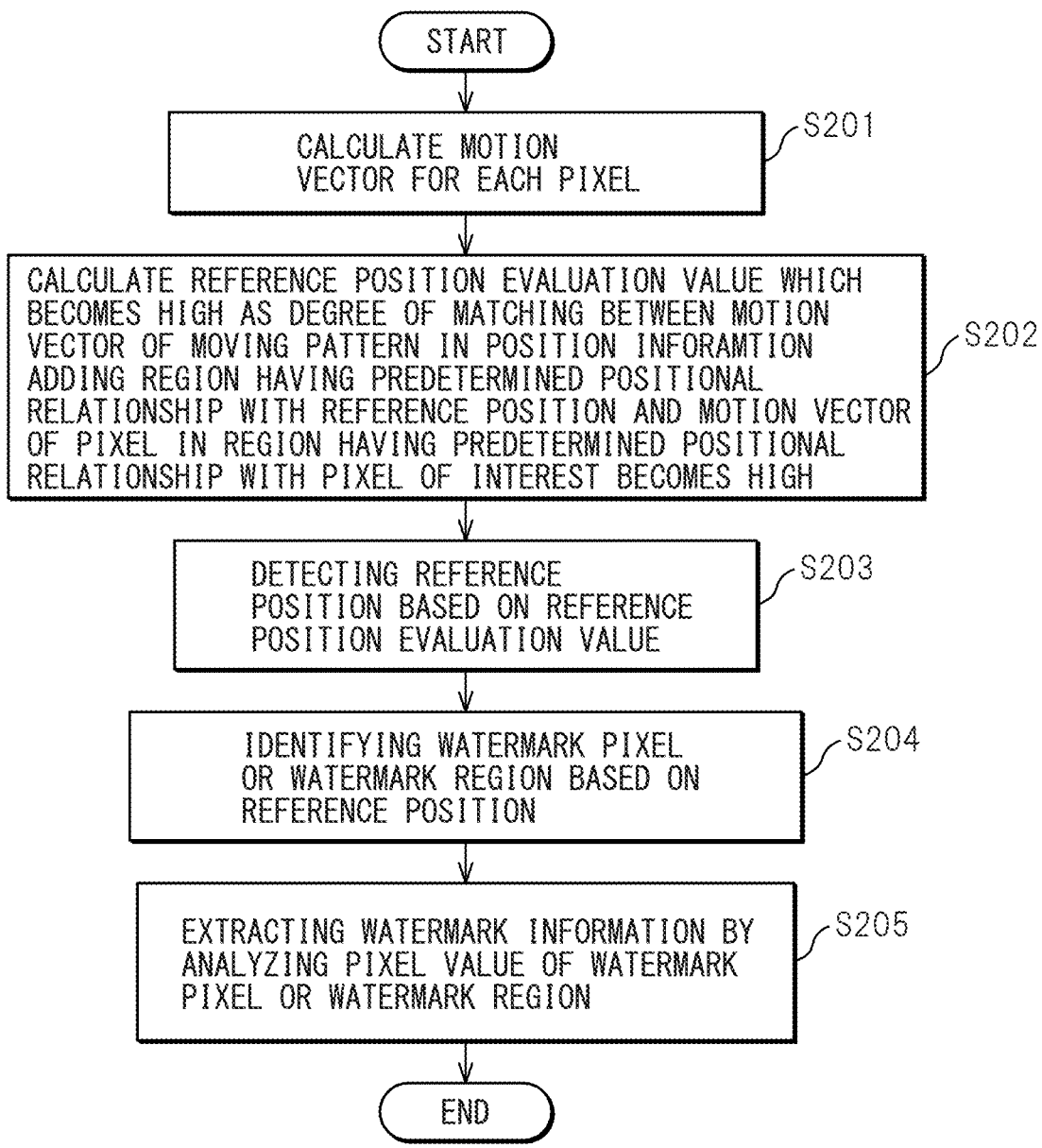
FIG. 16 is an operation flowchart of a digital watermark detection process.

FIG. 16 is an operation flowchart of a digital watermark detection process which is controlled by a computer program executed on the processing unit 33 of the digital watermark detection apparatus 2.

The motion vector calculating unit 41 of the processing unit 33 calculates a motion vector between a current and previous pictures for each pixel of the current picture, every time when a picture of watermark superimposed video data is acquired (step S201). Then the motion vector calculating unit 41 notifies the evaluation value calculating unit 42 of the motion vector of each pixel. The evaluation value calculating unit 42 obtains a reference position evaluation value which becomes high as a degree of matching between a motion vector of a moving pattern in a position information adding region having a predetermined positional relationship with a reference position and a motion vector of a pixel in a region having the predetermined positional relationship with a pixel of interest becomes high (step S202). The evaluation value calculating unit 42 notifies the reference position detection unit 43 of the reference position evaluation value.

The reference position detection unit 43 detects a reference position on the current picture based on the reference position evaluation value (step S203). The reference position detection unit 43 notifies the information extraction unit 44 of the detected reference position.

The information extraction unit 44 identifies a watermark pixel or a watermark region on the current picture based on the reference position (step S204). The information extraction unit 44 extracts watermark information by analyzing a pixel value of the identified watermark pixel or watermark region (step S205). Then the processing unit 33 terminates the digital watermark detection process.

As has been described above, the digital watermark detection apparatus according to the present embodiment detects a reference position based on a distribution of a pixel having a motion vector which matches with a motion vector representing a moving direction and a move quantity of a moving pattern. The digital watermark detection apparatus identifies a watermark pixel or a watermark region into which digital watermark information is embedded based on reference positions. Accordingly, the digital watermark detection apparatus can identify a watermark pixel or a watermark region even when outer edges of an original picture are not captured on a picture of watermark superimposed video data. In addition, in a case that a camera shake occurs when video data with embedded digital watermark information is re-captured with a video camera or the like, a move quantity of a figure between two pictures successive in time due to the camera shake is small. Therefore, since influence of a camera shake on a motion vector is small, the digital watermark detection apparatus can detect a reference position even when a camera shake occurs at a time of re-shooting for video data.

Next, a digital watermark detection apparatus according to a third embodiment will be described. The digital watermark detection apparatus according to the third embodiment extracts a feature quantity of a texture corresponding to a moving pattern from each picture included in watermark superimposed video data and detects a reference position based on the feature quantity. The digital watermark detection apparatus according to the third embodiment is different only in processing with respect to detection of a reference position by the processing unit, compared with the digital watermark detection apparatus according to the second embodiment. In the following, points with regard to detection of a reference position are described.

Figure 17:
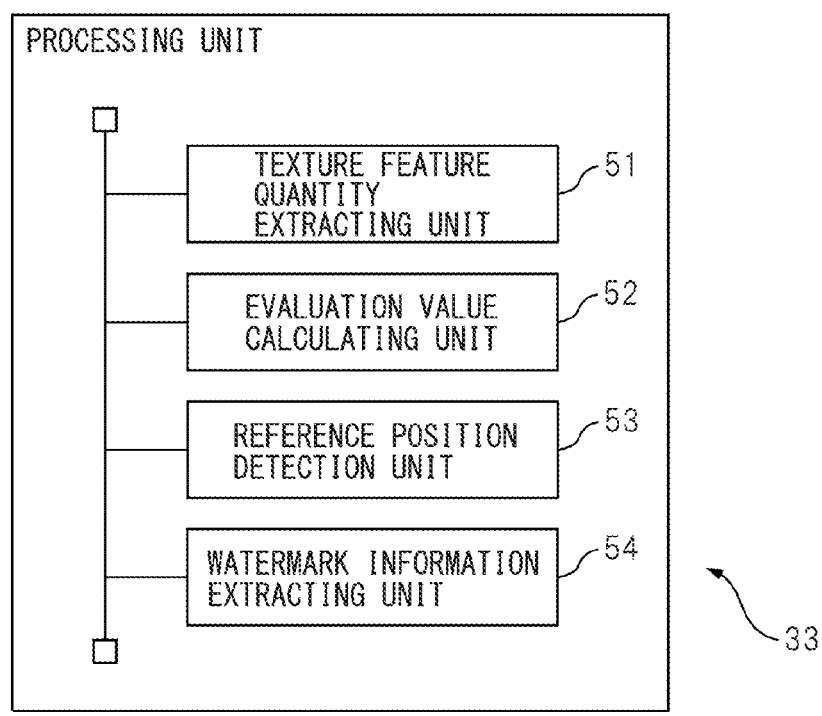
FIG. 17 is a block diagram illustrating functions of a processing unit of a digital watermark detection apparatus according to a third embodiment.

FIG. 17 is a block diagram illustrating functions of a processing unit according to the third embodiment which is implemented in order to detect a reference position from watermark superimposed video data and in order to detect digital watermark information. The processing unit 33 includes a texture feature quantity extracting unit 51, an evaluation value calculating unit 52, a reference position detection unit 53, and a watermark information extracting unit 54.

Every time when a picture of watermark information superimposed video data is acquired, the texture feature quantity extracting unit 51 extracts a texture feature quantity representing a spatial feature of a moving pattern embedded into a position information adding region from a current picture which is the latest picture. The texture feature quantity extracting unit 51 is an example of a feature quantity extracting unit.

For example, as illustrated in FIG. 5A or FIG. 5B, when a moving pattern is a one-dimensional striped pattern, the texture feature quantity may be a frequency component corresponding to a pitch of the stripe along a direction in which a pixel value changes.

Figure 18A:
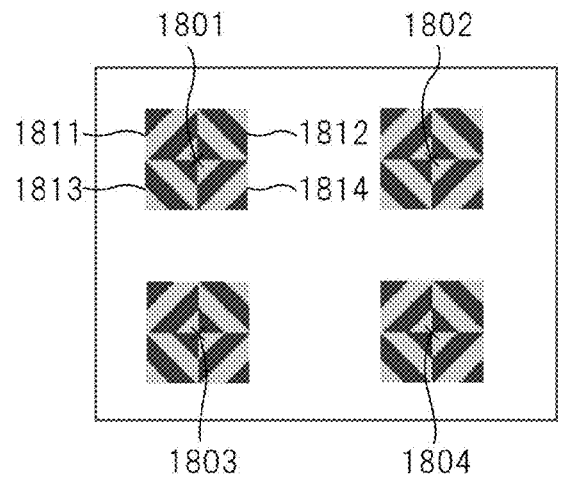
FIG. 18A is a diagram illustrating an example of moving patterns embedded into a picture.

In the following, extraction of a texture feature quantity will be described with reference to FIG. 18A to FIG. 18C. As illustrated in FIG. 18A, a one-dimensional striped moving pattern is embedded into each of position information adding regions which are set around four reference positions 1801 to 1804 in a current picture 1800. For example, a moving pattern in which a pixel value changes along a direction from upper left to lower right is embedded into position information adding regions 1811 and 1814 located at upper left and lower right of the reference position 1801. On the other hand, a moving pattern in which a pixel value changes along a direction from upper right to lower left is embedded into position information adding regions 1812 and 1813 located at upper right and lower left of the reference position 1801.

The texture feature quantity extracting unit 51 sets a window for each pixel of the current picture, the window centered on the pixel including a segment of pixels in a direction from upper left to lower right. Then the texture feature quantity extracting unit 51 performs a one-dimensional Fourier transform on the pixel segment included in the window and calculates a frequency component of the direction from upper left to lower right for each pixel. Note that the length of the window is set, for example, to the diagonal length of a position information adding region.

Similarly, the texture feature quantity extracting unit 51 sets a window for each pixel of the current picture, the window centered on the pixel including a segment of pixels in a direction from upper right to lower left. Then the texture feature quantity extracting unit 51 performs a one-dimensional Fourier transform on the pixel segment included in the window and calculates a frequency component of the direction from upper right to lower left for each pixel.

Note that the texture feature quantity extracting unit 51 may set a two-dimensional window centered on a pixel of interest, perform a two-dimensional Fourier transform on an array of pixels included in the window, and calculate a frequency component of a direction from upper left to lower right and a frequency component of a direction from upper right to lower left. In this case, the size of the two-dimensional window is set, for example, to be equal to the size of a position information adding region.

Note that the difference between the maximum pixel value and the minimum pixel value of a moving pattern is set to be a small value (for example, 3 or less) such that the moving pattern is not perceived. Accordingly, when the difference of pixel values between a pixel of interest on the current picture and an adjacent pixel is larger than the difference between the maximum pixel value and the minimum pixel value of the moving pattern, it is possible that edges of a figure on the current picture is captured on the pixel of interest and the periphery of the pixel of interest. When a difference value between the adjacent pixels is larger than the difference between the maximum pixel value and the minimum pixel value of the moving pattern, the texture feature quantity extracting unit 51 may perform a preprocessing in which the value of the pixel of interest is replaced with a pixel value of an adjacent pixel or replaced with an average pixel value of the pixel of interest and the adjacent pixels. The preprocessing eliminates the edges of the figure. Thereafter, the texture feature quantity extracting unit 51 may perform Fourier transform on a pixel segment included in the window set for each pixel.

The texture feature quantity extracting unit 51 notifies the evaluation value calculating unit 52, as a texture feature quantity, of the frequency component of the direction in which each moving pattern changes, the frequency component being calculated for each pixel of the current picture. Note that a texture feature quantity to be extracted is not limited to the above example. A texture feature quantity may be a feature quantity representing a spatial feature of a moving pattern embedded into a position information adding region. For example, the texture feature quantity extracting unit 51 may obtain, as a texture feature quantity, a normalized cross-correlation value between a template representing a moving pattern and a region centered on a pixel of interest with the same size as the template.

The evaluation value calculating unit 52 calculates a reference position evaluation value for each pixel of the current picture based on a texture feature quantity of the pixel and surrounding pixels.

Figure 18B:
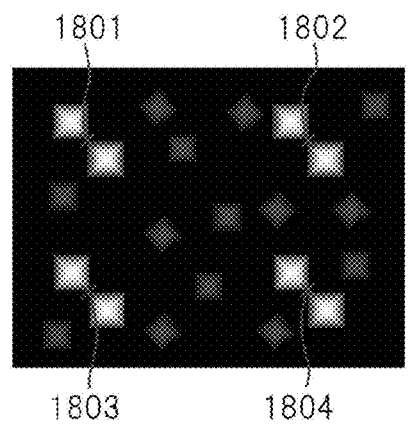
FIG. 18B is a diagram depicting an example of a distribution of the highest frequency component corresponding to a pitch of a moving pattern of a direction from upper left to lower right for the picture illustrated in FIG. 18A.
Figure 18C:
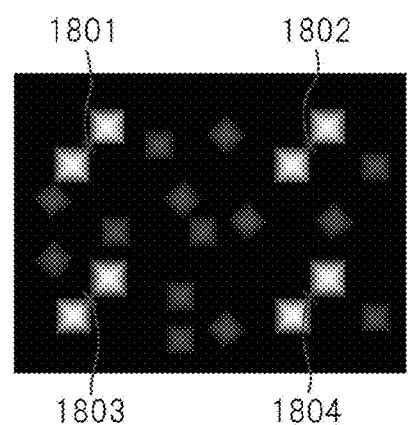
FIG. 18C is a diagram depicting an example of a distribution of the highest frequency component corresponding to a pitch of a moving pattern of a direction from upper right to lower left for the picture illustrated in FIG. 18A.

FIG. 18B is a diagram depicting an example of a distribution of the highest frequency component corresponding to a pitch of a moving pattern of a direction from upper left to lower right in a picture into which the moving pattern illustrated in FIG. 18A is embedded. FIG. 18C is a diagram depicting an example of a distribution of the highest frequency component corresponding to a pitch of a moving pattern of a direction from upper right to lower left in a picture into which the moving pattern illustrated in FIG. 18A is embedded. FIG. 18B and FIG. 18C illustrate that a frequency component corresponding to a pitch of a moving pattern becomes large as a pixel becomes white.

FIG. 18B illustrates that a frequency component with a direction from upper left to lower right is large in the upper left and lower right regions of the reference positions 1801 to 1804. In addition, a frequency component becomes maximum at a pixel corresponding to the center of the position information adding region located at upper left or lower right of each of the reference positions 1801 to 1804. FIG. 18C illustrates that a frequency component with a direction from upper right to lower left is large in the upper right and lower left regions of the reference positions 1801 to 1804. In addition, a frequency component becomes maximum at a pixel corresponding to the center of the position information adding region located at upper right or lower left of each of the reference positions 1801 to 1804.

The evaluation value calculating unit 52 determines a reference position evaluation value for a pixel of interest of a current picture based on a frequency component of a pixel corresponding to the center of a position information adding region surrounding the pixel of interest, assuming that the pixel of interest is at a reference position.

Figure 19:
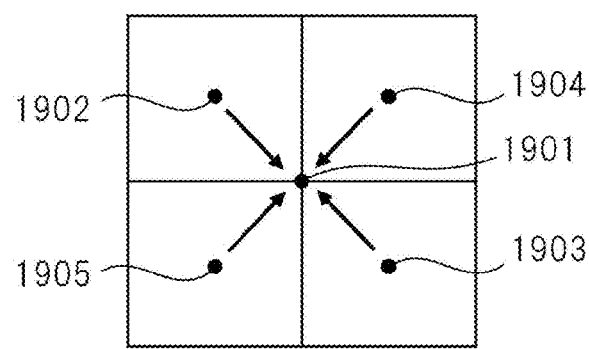
FIG. 19 is a diagram illustrating an example of the positional relationship between a pixel of interest and a pixel used for calculating a texture feature quantity of the pixel of interest.

FIG. 19 is a diagram illustrating an example of the positional relationship between a pixel of interest and a pixel used for calculating a texture feature quantity of the pixel of interest. As illustrated above, in this example, a moving pattern in which a pixel value changes in a direction from upper left to lower right is embedded into position information adding regions located at upper left and lower right of the reference position. The evaluation value calculating unit 52 sets reference points at points 1902 and 1903 which are located at half of the length in diagonal direction of the position information adding region away from a pixel of interest 1901 in an upper left direction or a lower right direction. Then the evaluation value calculating unit 52 refers to values of frequency components fA and fB corresponding to a pitch of the moving pattern of the direction from upper left to lower right at the reference points 1902 and 1903.

In addition, a moving pattern in which a pixel value changes in the direction from upper right to lower left is embedded into the position information adding regions located at upper right and lower left of the reference position. The evaluation value calculating unit 52 sets reference points at points 1904 and 1905 which are located at half of the length in diagonal direction of the position information adding region away from the pixel of interest 1901 in the upper right direction or the lower left direction. Then the evaluation value calculating unit 52 refers to values of frequency components fC and fD corresponding to a pitch of the moving pattern of the direction from upper right to lower left at the reference points 1904 and 1905.

The evaluation value calculating unit 52 calculates a reference position evaluation value T of the pixel of interest 1901 in the following equation.

$$T = \min(fA, fB, fC, fD)$$

Note that a function min(fA,fB,fC,fD) is a function for outputting the minimum value among (fA,fB,fC,fD). The likelihood that the pixel of interest is on a reference position increases as the reference position evaluation value T becomes large.

The evaluation value calculating unit 52 passes the reference position evaluation value T obtained for each pixel of the current picture to the reference position detection unit 53.

The reference position detection unit 53 detects a reference position based on the reference position evaluation value T of each pixel of the current picture. As described above, as the reference position evaluation value T becomes large, the likelihood that the pixel corresponding to the reference position evaluation value T is on a reference point increases. Then, similarly to the reference position detection unit 43 of the digital watermark detection apparatus according to the second embodiment, the reference position detection unit 53 sequentially detects, as a reference position, a pixel at which the reference position evaluation value T becomes maximum.

The reference position detection unit 53 notifies the watermark information extracting unit 54 of the detected reference positions. Similarly to the watermark information extracting unit 44 of the digital watermark detection apparatus according to the second embodiment, the watermark information extracting unit 54 identifies watermark pixels or watermark regions based on the reference positions. Then the watermark information extracting unit 54 extracts embedded digital watermark information by analyzing the pixel values of the watermark pixels or the watermark regions.

Following a similar flow to the operation flowchart of the digital watermark detection process illustrated in FIG. 16, the digital watermark detection apparatus according to the third embodiment can extract digital watermark information by detecting reference positions on the current picture. However, the texture feature quantity extracting unit 51 obtains a texture feature quantity for each pixel of the current picture in step S201 and the evaluation value calculating unit 52 obtains a reference position evaluation value based on the texture feature quantity in step S202.

According to the present embodiment, the digital watermark detection apparatus can detect reference positions from one picture. Therefore, even when a camera shake occurs when re-shooting of video data, the digital watermark detection apparatus can accurately detect reference positions regardless of the camera shake.

Next, a digital watermark detection apparatus according to a fourth embodiment is explained. The digital watermark detection apparatus according to the fourth embodiment detects reference positions on a picture by detecting a texture feature quantity corresponding to a texture of a moving pattern and a motion vector of a moving pattern from each picture included in watermark superimposed video data. The digital watermark detection apparatus according to the fourth embodiment is different only in processing with regard to detection of reference positions by the processing unit, compared with the digital watermark detection apparatus according to the second embodiment. In the following, points with regard to detection of reference positions are described.

Figure 20:
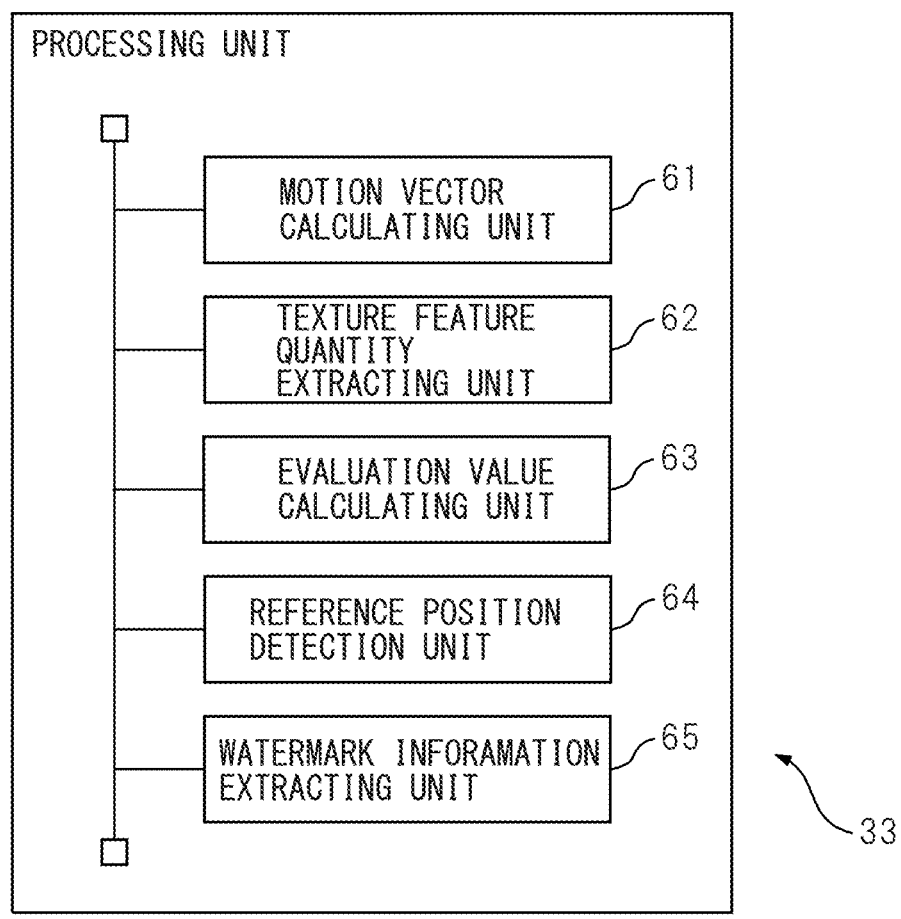
FIG. 20 is a block diagram illustrating functions of a processing unit of a digital watermark detection apparatus according to a fourth embodiment.

FIG. 20 is a block diagram illustrating functions of a processing unit which is implemented in order to detect a reference position and watermark information from superimposed video data according to the fourth embodiment. The processing unit 33 includes a motion vector calculating unit 61, a texture feature quantity extracting unit 62, an evaluation value calculating unit 63, a reference position detection unit 64, and a watermark information extracting unit 65.

Similarly to the motion vector calculating unit 41 of the digital watermark detection apparatus according to the second embodiment, every time when a picture of watermark information superimposed video data is acquired, the motion vector calculating unit 61 calculates a motion vector for each pixel of a current picture. Similarly to the texture feature quantity extracting unit 51 of the digital watermark detection apparatus according to the third embodiment, the texture feature quantity extracting unit 62 obtains a texture feature quantity for each pixel of the current picture.

Similarly to the evaluation value calculating unit 42 of the digital watermark detection apparatus according to the second embodiment, the evaluation value calculating unit 63 calculates a first reference position evaluation value of each pixel of the current picture based on the motion vector. In addition, similarly to the evaluation value calculating unit 52 of the digital watermark detection apparatus according to the third embodiment, the evaluation value calculating unit 63 calculates a second reference position evaluation value of each pixel of the current picture based on the texture feature quantity. Then the evaluation value calculating unit 63, for example, normalizes the first reference position evaluation value and the second reference position evaluation value for each pixel so that each reference position evaluation value is to be a value within a predetermined range (for example, 0 to 1). Then the evaluation value calculating unit 63 calculates, as a total evaluation value, the average value or a total of the normalized first reference position evaluation value and the normalized second reference position evaluation value.

The reference position detection unit 64 determines reference positions based on the total evaluation value calculated by the evaluation value calculating unit 63 for each pixel of the current picture. Similarly to the reference position detection unit 43 of the digital watermark detection apparatus according to the second embodiment, the reference position detection unit 64 sequentially detects, as a reference position, a pixel at which the total evaluation value becomes maximum.

The watermark information extracting unit 65 identifies a watermark pixel or a watermark region on the current picture into which digital watermark information is embedded based on the detected reference position, and extracts the embedded digital watermark information by analyzing pixel values of the watermark pixel or the watermark region.

The digital watermark detection apparatus according to the fourth embodiment can also detect reference positions on the current picture and extract digital watermark information according to a flow similar to the operation flowchart of the digital watermark detection process illustrated in FIG. 16. However, in step S201, the motion vector calculating unit 61 obtains a motion vector for each pixel of the current picture and the texture feature quantity extracting unit 62 also obtains a texture feature quantity for each pixel of the current picture. In step S202, the evaluation value calculating unit 63 obtains a total evaluation value based on a first reference position evaluation value obtained from a motion vector and a second reference position evaluation value obtained from a texture feature quantity. In step S203, the reference position detection unit 64 sequentially detects, as a reference position, a pixel at which the total evaluation value becomes maximum.

Since the digital watermark detection apparatus according to the present embodiment can also detect reference positions based on two pictures successive in time, even when a camera shake occurs when re-shooting of video data, reference positions can be accurately detected regardless of the camera shake. In addition, since the digital watermark detection apparatus uses both a motion vector which is a feature quantity with regard to a temporal variation of an embedded moving pattern and a texture feature quantity which is a spatial feature quantity of a moving pattern, accuracy of detection of reference positions can be improved.

The digital watermark embedding apparatus according to each of the above embodiments may be incorporated, for example, in a set-top box, a server, or a personal computer. An apparatus in which the digital watermark embedding apparatus is incorporated performs, when the video data is replayed, the digital watermark embedding process described above on video data which is a content received, for example, through a communication network or an antenna. When the video data is compressed by a predetermined compression scheme, the apparatus decodes each image in the video data in accordance with the predetermined compression scheme. The apparatus stores each of the images included in the video data in a buffer memory of the apparatus in time series order. Then the apparatus retrieves the images from the buffer memory in time series order, performs the digital watermark embedding process, and displays the images on a display in which the digital watermark information is embedded.

In addition, the position information adding apparatus disclosed in the present specification may be applied to an apparatus, other than the digital watermark embedding apparatus, in which addition of information to identify an arbitrary position on an image is desirable. In this case, the digital watermark embedding unit according to the above embodiments may be omitted from the position information adding apparatus. Similarly, the position detection apparatus disclosed in the present specification may be applied to an apparatus, other than the digital watermark detection apparatus, for detecting an arbitrary position on an image. In this case, the watermark information extracting unit according to the above embodiments may be omitted from the position detection apparatus.

In addition, a computer program which implements each function of the processing unit of the digital watermark embedding apparatus according to the above embodiments may be provided in a form in which the program is recorded on a computer readable medium such as a magnetic recording medium, an optical recording medium, or the like. Similarly, a computer program which implements each function of the processing unit of the digital watermark detection apparatus according to each of the above embodiments may be provided in a form in which the program is recorded on a computer readable medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A position detection apparatus for detecting a reference position on a picture which is contained in digitized video data, and in which a first moving pattern which moves in a first temporal period is embedded on a first position information adding region having a first positional relationship with the reference position and a second moving pattern which moves in a second temporal period is embedded on a second position information adding region having a second positional relationship with the reference position, the position detection apparatus comprising:
    a feature quantity extracting unit which obtains a feature quantity for each pixel of the picture which represents at least either a movement of a pattern captured on a region containing the pixel or a spatial feature of the pattern;
    an evaluation value calculating unit which obtains an evaluation value, for a predetermined region on the picture, representing a degree of likelihood that the predetermined region is at the reference position, based on the feature quantity of a pixel within a region having the first positional relationship with the predetermined region and the feature quantity of a pixel within a region having the second positional relationship with the predetermined region; and
    a reference position detection unit which detects the reference position based on the predetermined region with a maximum evaluation value.

2. The position detection apparatus according to claim 1, wherein
    for each pixel of the picture, the feature quantity calculating unit calculates, as the feature quantity, a motion vector of a pattern captured on a region containing the pixel, based on a positional difference between the pixel and a pixel at which a pixel value difference therebetween is minimum on an immediately preceding picture,
    the evaluation value calculating unit sets the evaluation value high as a degree of matching between the first reference feature quantity which is a motion vector of the first moving pattern and the feature quantity of a pixel, which is a pixel on the picture, in a region having the first positional relationship with the predetermined region is high and a degree of matching between the second reference feature quantity which is a motion vector of the second moving pattern and the feature quantity of a pixel in a region having the second positional relationship with the predetermined region is high, and
    the reference position detection unit detects, as the reference position, the predetermined region with a maximum evaluation value.

3. The position detection apparatus according to claim 1, wherein
    for each pixel of the picture, the feature quantity calculating unit calculates, as the feature quantity, a frequency component of a first direction at a region containing the pixel and a frequency component of a second direction different from the first direction,
    the evaluation value calculating unit sets the evaluation value high as a frequency component corresponding to a frequency component of the first direction of the first moving pattern, among the feature quantity of a pixel, which is a pixel on the picture, in a region having the first positional relationship with the predetermined region and a frequency component corresponding to a frequency component of the second direction of the second moving pattern, among the feature quantity of a pixel in a region having the second positional relationship with the predetermined region, and
    the reference position detection unit detects, as the reference position, the predetermined region with a maximum evaluation value.

4. The position detection apparatus according to claim 1, wherein
    the reference position is on a boundary of the first position information adding region and the second position information adding region,
    for each pixel of the picture, the feature quantity calculating unit calculates, as the feature quantity, a motion vector of a pattern captured on a region containing the pixel, based on a positional difference between the pixel and a pixel at which a pixel value difference therebetween is minimum on an immediately preceding picture,
    the evaluation value calculating unit sets, with respect to a row or a column of the picture in the predetermined region, a first region and a second region bounded by the row or the column, and obtains, as the evaluation value, a total of an average number of pixels for each row or column contained in the first region, the pixels having the feature quantity matching with the first reference feature quantity which corresponds to a motion vector of the first moving pattern and an average number of pixels for each row or column contained in the second region, the pixels having the feature quantity matching with the second reference feature quantity which corresponds to a motion vector of the second moving pattern, and the reference position detection unit detects, as the reference position, an intersection of a row with a maximum evaluation value and a column with a maximum evaluation value.

5. The position detection apparatus according to claim 1, wherein digital watermark information is embedded into a watermark region having a third positional relationship with the reference position on the picture of the video data, and the position detection apparatus further comprises a watermark information extracting unit which extracts the watermark information by analyzing a value of a pixel in a region having the third positional relationship with a pixel detected as the reference position by the reference position detection unit.

* * * * *